United States Patent
Tanii et al.

(10) Patent No.: US 6,313,843 B1
(45) Date of Patent: Nov. 6, 2001

(54) APPARATUS AND METHOD FOR CONTROLLING IMAGE DISPLAY, AND RECORDING MEDIUM STORING PROGRAM FOR CONTROLLING IMAGE DISPLAY

(75) Inventors: Yoko Tanii, Tachikawa; Shunichi Teraoka, Fussa, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/139,704

(22) Filed: Aug. 25, 1998

(30) Foreign Application Priority Data

Aug. 27, 1997 (JP) .................................... 9-231566
Aug. 27, 1997 (JP) .................................... 9-231567
Aug. 27, 1997 (JP) .................................... 9-231568
Aug. 27, 1997 (JP) .................................... 9-231569

(51) Int. Cl.$^7$ .................................................. G06F 15/00
(52) U.S. Cl. .............................................................. 345/473
(58) Field of Search .................................. 345/473, 474, 345/475, 133, 136, 117

(56) References Cited

U.S. PATENT DOCUMENTS

| | | | |
|---|---|---|---|
| 5,261,041 | 11/1993 | Susman | 345/419 |
| 5,572,646 | 11/1996 | Kawai et al. | 345/501 |
| 5,933,152 | * 8/1999 | Naruki et al. | 345/501 |
| 5,966,526 | * 8/1999 | Yokoi | 395/500 |

* cited by examiner

Primary Examiner—Phu K. Nguyen
(74) Attorney, Agent, or Firm—Frishauf, Holtz, Goodman, Langer & Chick, P.C.

(57) ABSTRACT

An image display control device includes a storage section storing section storing sequential behavior of living thing images, a display section for displaying the living thing images stored in the storage section, a discrimination data setting section for arbitrarily setting individual data so as to be associated with each of the living thing images stored in the storage section, and a display control section for varying behaviors of the living thing images displayed on the display means based on the sequential behavior images stored in the storage means in accordance with the individual discrimination data set by the discrimination setting means. When a user arbitrarily gives a name to a living thing image, a display pattern of the living thing image varies in accordance with the name. Thus, characteristics of living thing images differ from each other on the basis of its own given name.

21 Claims, 19 Drawing Sheets

APPARATUS AND METHOD FOR CONTROLLING IMAGE DISPLAY, AND RECORDING MEDIUM STORING PROGRAM FOR CONTROLLING IMAGE DISPLAY

BACKGROUND OF THE INVENTION

1. Field of the Invention

The present invention relates to an apparatus and a method for controlling image display and a recording medium storing a program for controlling image display which enable a pre-stored living thing image, such as an image of an animal, a plant or a virtual living thing, to show unexpectable behaviors.

2. Description of the Related Art

An image display control apparatus which displays a living thing image, such as an animal image, has been known conventionally. In such the apparatus, a user operates a plurality of keys on a key input section to move or vary a displayed image. That is, when a user selectively operates cross-directional cursor keys, a living thing image of, for example, a dog moves in accordance with the input direction.

In such the conventional image display control apparatus, however, a displayed living thing image is merely varied or moved in accordance with key operations by a user and a moved or varied image is merely displayed thereon. The conventional apparatus cannot give a user fun to bring up a living thing image, such as a dog, with feeling similar to that experienced through actual raising activities.

Some of recent image display control apparatus have virtual raising mode which makes a user feed elements necessary for growth, such as foods, to a living thing image. The displayed living thing image is varied in accordance with the user's raising operations.

Such the apparatus stores the degree of the user's raising operations as parameter. The apparatus determines health conditions, expressions, and the like of the living thing image based on the parameter. The determined matters influences the variance of the living thing image. This brings realistic virtual raising. Shown parameters during the raising operation helps a user to bring up the living thing finely.

However, the living thing image in such the apparatus has no individuality. In other words, the same variance appears if the same raising operation has been done by a different user.

SUMMARY OF THE INVENTION

The present invention has been made in consideration of the above. It is an object of the present invention to provide an apparatus and a method for controlling image display and a recording medium storing a program for controlling image display which give a living thing image variety behavior which is unexpectable for a user, and individuality.

It is another object of the present invention to provide an apparatus and a method for controlling image display and a recording medium storing a program for controlling image display, which enable a living thing image to show unexpectable behaviors based on determination whether the user's raising operation is well or not.

To achieve the above objects, it is provided an image display control device which comprises:

living thing image storage means for storing sets of living thing images each set representing sequential behavior a living thing;

display means for reading the living thing images from said living thing image storage means and for displaying the read images so as to display sequential behavior of the living thing;

discrimination data setting means for setting arbitral discrimination data to each set of the living thing images stored in said living thing image storage means; and display control means for controlling said display means so that the sequential behavior of the living thing is displayed thereon by displaying the living thing images included in the set in accordance with the discrimination data set by said discrimination data setting means.

DETAILED DESCRIPTION OF THE PREFERRED EMBODIMENT

An embodiment of the present invention will now be described with reference to accompanied drawings.

Figure 1:
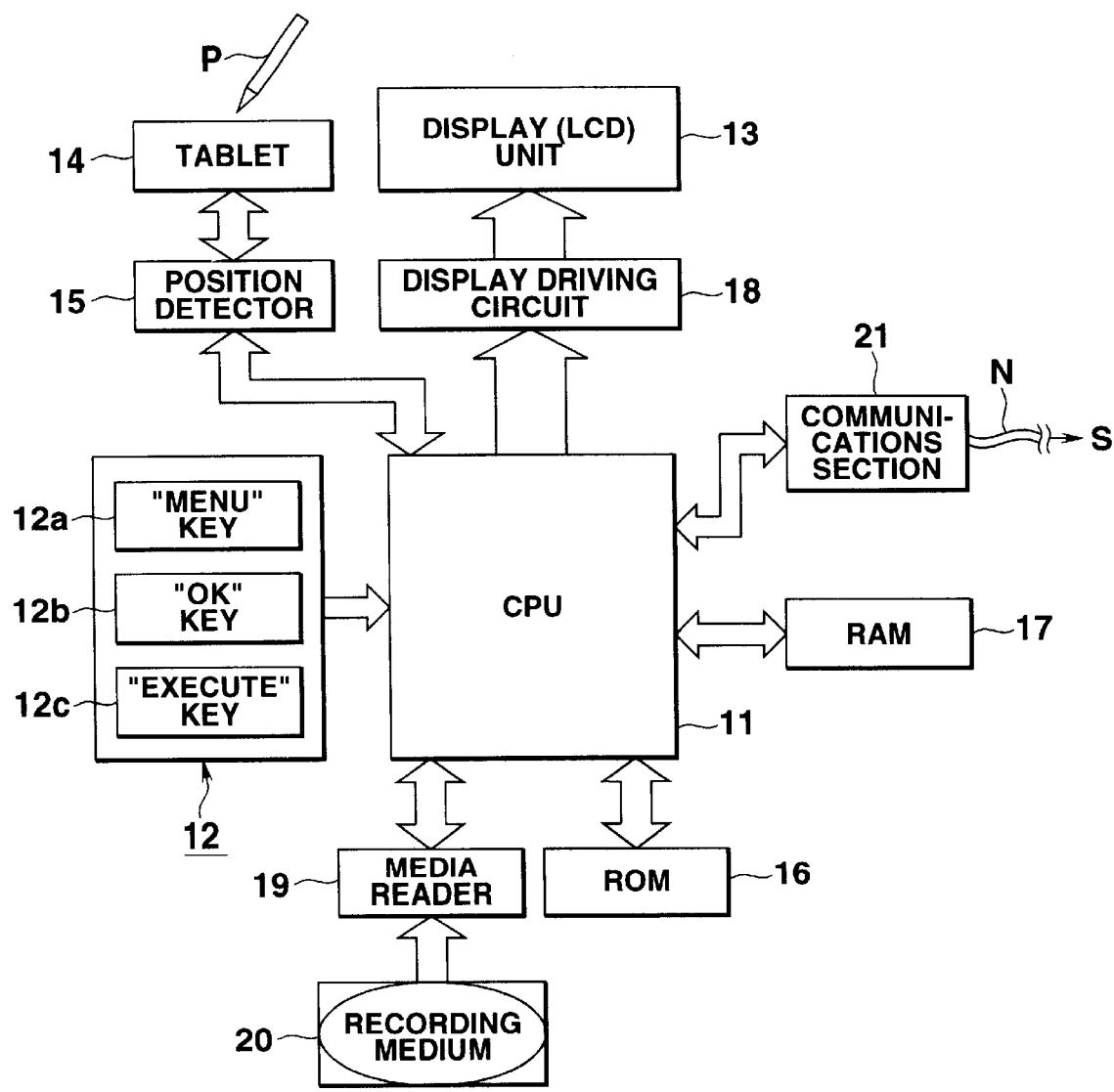
FIG. 1 is a block diagram showing a circuit structure of a PDA (Personal Data Assistance) employing an image display control device according to an embodiment of the present invention.

FIG. 1 is a block diagram showing a circuit structure of a PDA (Personal Data Assistance) comprising an image display device according to this embodiment of the present invention.

The PDA has suitable size and shape for carrying, and includes a control unit (CPU) 11, such as a microcomputer, therein.

The CPU 11 boots a system program, which is previously stored in a ROM 16, in accordance with key data input from a key input section 12 and X-Y coordinates data (position data) indicating positions where a pen P touches on a tablet 14. The tablet 14 is an on-screen tablet provided on a liquid crystal display (LCD) unit 13. The position data is input to the CPU 11 via a position detector 15. The CPU 11 controls a media reader 19 to read a PDA operating program from an external storage which previously stores the program and boots the read program as needed. Or, the CPU 11 boots a program received through a communications section 21 as needed. The CPU 11 controls the whole operations in the circuit with using a RAM 17 as work area.

Connected to the CPU 11 are the key input section 12, the LCD unit 13, the tablet 14, the position detector 15, the ROM 16, the RAM 17, the media reader 19 and the communications section 21. Note that a display driving circuit 18 intervenes between the CPU 11 and the LCD unit 13.

Provided on the key input section 12 are a "Menu" key 12a, an "OK" key 12b, an "Execute" key 12c, and the like.

Figure 12A:
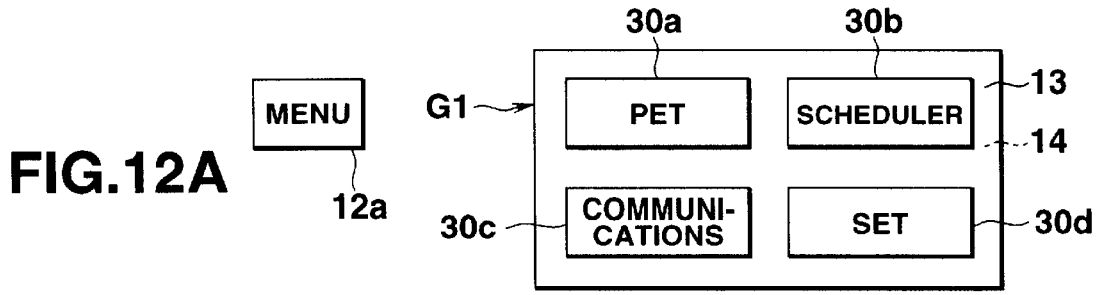
FIGS. 12A to 12E are diagrams showing an operation panel for registration of pet's name displayed on the image display control device employed in the PDA.

The "Menu" key 12a is used for displaying a mode select panel G1 (see FIG. 12A). The mode select panel G1 has buttons (icons) each linked to modes such as pet raising mode, scheduler mode, communications mode, or the like. The pet raising mode allows a user to bring up pre-stored character images (for example, a hamster, a deer and the like) as a pet. The scheduler mode is invoked when a user want to input or search data including memos, phone numbers, scheduled matters and the like. The communications mode allows the apparatus to communicate with the other terminal via the public switched telephone network (PSTN).

Pressing "OK" key 12b allows data entry. The "OK" key 12b is also used for displaying a pet menu select panel G4 (see FIG. 12E). The panel G4 is provided for selecting functions during the pet raising mode.

A user sets or selects functions, and press the "Execute" key 12c to execute the function.

The tablet 14 is provided on a screen of the LCD unit 13. The position detector 15 detects X-Y coordinates on the screen based on the voltage generated by the tablet 14. The voltage changes in accordance with position where the pen P touches. The CPU 11 determines what operation is done or selected, on the basis of the detected position.

A system program, which controls general processing (see FIG. 5) of the circuit in the PDA, is previously stored in the ROM 16. The ROM 16 also stores a sub program called an operating program. The operating program controls processing such as displaying initial stage screens (FIG. 6), executing the pet raising mode (FIGS. 7–9), displaying the registered pet (FIG. 10), display controlling (FIG. 11) and the like.

Figure 2:
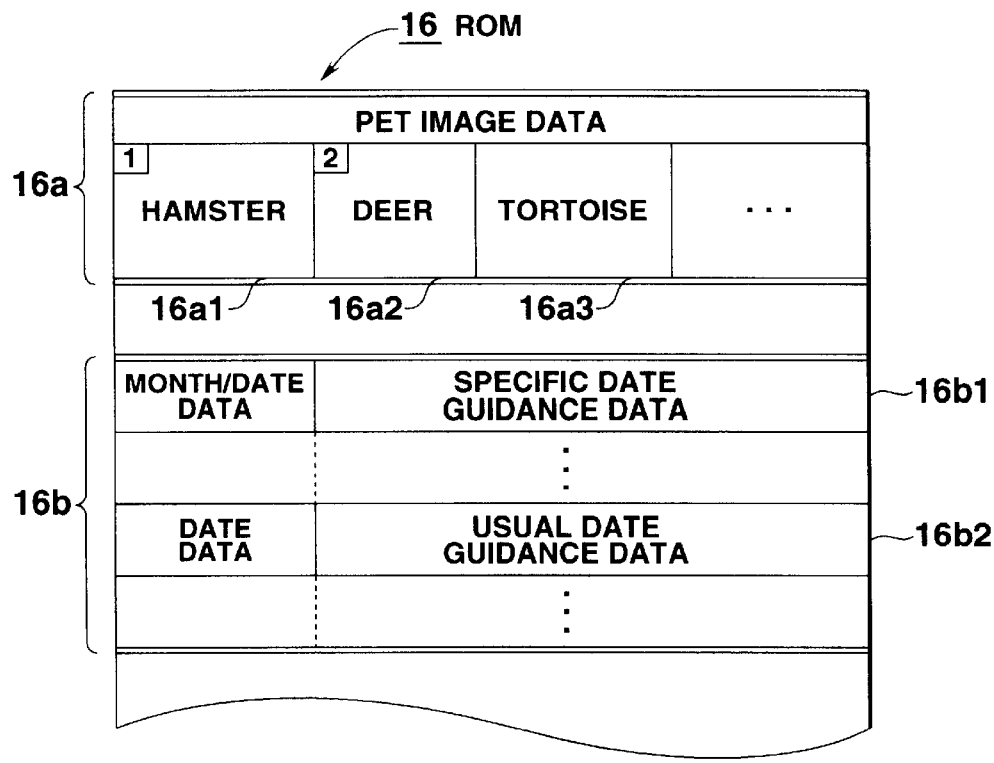
FIG. 2 is a diagram showing the structure of data, mainly used during a pet raising mode, stored in a ROM of the PDA employing the image display control device.

FIG. 2 shows individual ROM areas in the ROM 16. The shown individual ROM areas are mainly used for executing the pet raising mode. The individual ROM areas prepared for executing the pet raising mode are a pet image data ROM (area) 16a and a hidden guidance data ROM (area) 16b.

The pet image data ROM 16a stores image data of characters (pets) to be registered during the pet raising mode. It also stores image data of hidden characters (pets) each of which appears only at specific timings, for example, date, time, or the like. Each of the stored characters has a plurality of images corresponding to a plurality of actions such as eating, playing, walking, sleeping, being pleased, being angry, and the like. Those images are stored in bitmap form. Further, the pet image data ROM 16a has ROM areas such as a hamster image ROM 16a1, a deer image ROM 16a2, a tortoise image ROM 16a3, and the like.

The hidden guidance data ROM 16b also has ROM areas of a specific date guidance data ROM 16b1 and a usual date guidance data ROM 16b2. The specific date guidance data ROM 16b1 stores data representing a guidance message which appears when the hidden character appears on specific days. The usual date guidance data ROM 16b2 stores data representing a guidance message corresponding to date.

Figure 3:
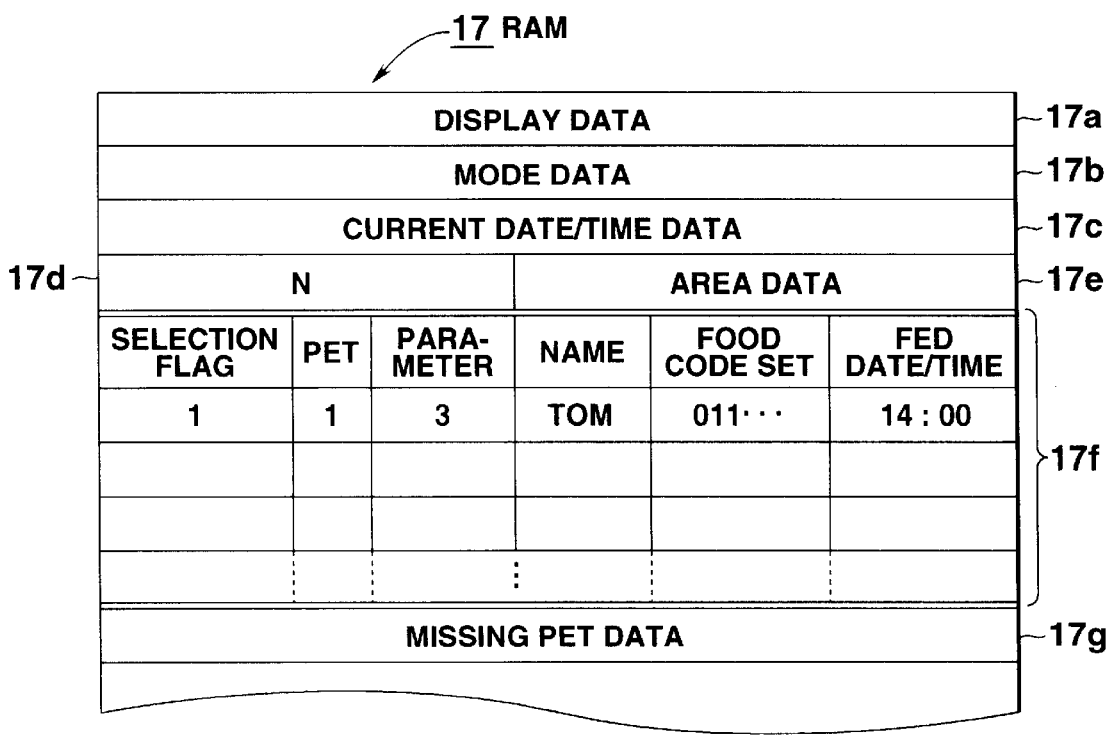
FIG. 3 is a diagram showing the structure of data, mainly used during the pet raising mode, stored in a RAM of the PDA employing the image display control device.

FIG. 3 shows the structure of memory areas in the RAM 17. The memory areas are mainly used during the pet raising mode.

The prepared memory areas are a display data memory (area) 17a (VRAM 17a), a mode data memory (area) 17b, a current date/time data memory (area) 17c, a pet-finder data memory (area) 17d, an area data memory (area) 17e, a registered pet status data memory (area) 17f, a missing pet data memory (area) 17g, and the like.

The VRAM 17a stores display data to be displayed on the LCD unit 13 in bitmap form.

The mode data memory 17b stores mode setting data representing what mode is selected through the mode select panel G1 (see FIG. 12A). The panel G1 opens when a user presses the "Menu" key 12a on the key input section.

The current date/time data memory 17c stores data representing current date and time. The data is renewed in accordance with a clock signal from a counter in the CPU 11.

The pet-finder data memory 17d stores numeric data N representing the number of seek trials necessary for finding a missing pet. The number of seek trial is in inverse proportion to the number of operations for taking care of the pet done so far.

Figure 20A:
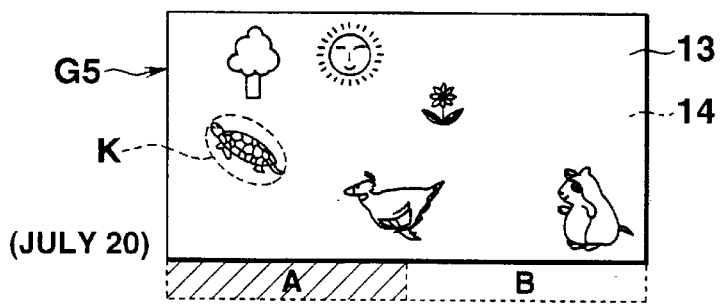
FIGS. 20A to 20E are diagrams process of displaying guidance messages corresponding to hidden character image display in the image display control device employed in the PDA.
Figure 20B:
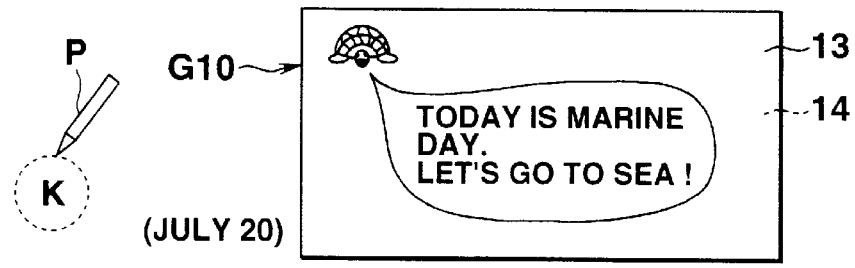
Figure 20C:
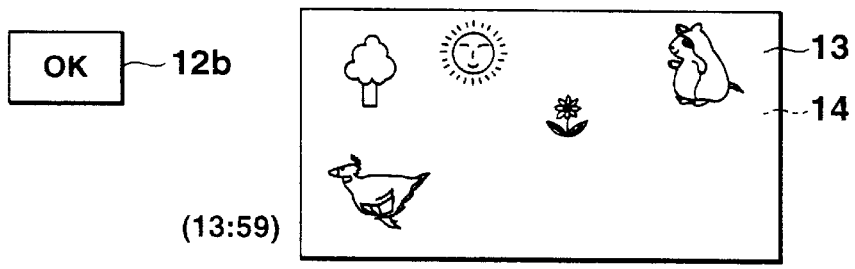
Figure 20D:
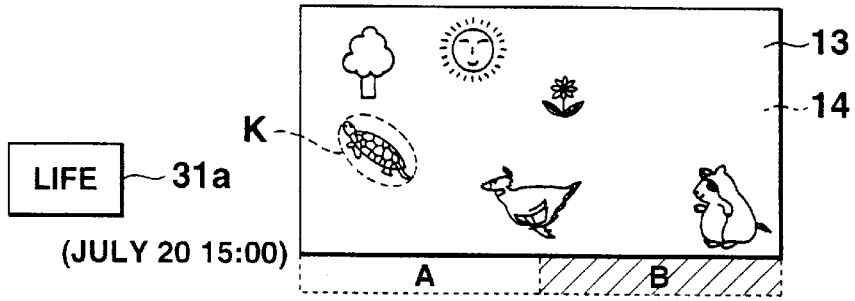

The area data memory 17e stores data representing areas A and B (see FIGS. 20A and 20D). The area A is a left half area of the screen, and the area B is a right half area of the screen. Those areas are switched from each other and a selected area is recognized as an active area. Touching the hidden character on the active area links to a later-described additional function.

The registered pet status data memory 17f stores items of "Selection Flag", "Pet No.", "Parameter", "Name", "Food Code", and "Feeding Record". "Selection Flag" is set for a pet character selected from the registered pet characters. "Pet No." indicates numbers which are assigned to the pet characters stored in the pet image data ROM 16a. "Parameter" represents the number of operations done for taking care of the pet (the number of feeding actions). "Name" represents name of the pet given by a user. The name is stored as character codes. "Food Code" indicates favorite food which is calculated on the basis of the character codes representing the pet's name. "Feeding Record" indicates date and time of the latest feeding action.

The missing pet data memory 17g stores data representing status of a pet which was fed at time at least 24 hours before the current time. The time lapse between the time of the last feeding and the current time is determined on the basis of the "Feeding Record" in the registered pet status data memory 17f. The data regarding to the status of the pet concern is transferred from the registered pet status data memory 17f. Those determination and operation are performed during the stage for setting the pet raising mode.

Figure 4:
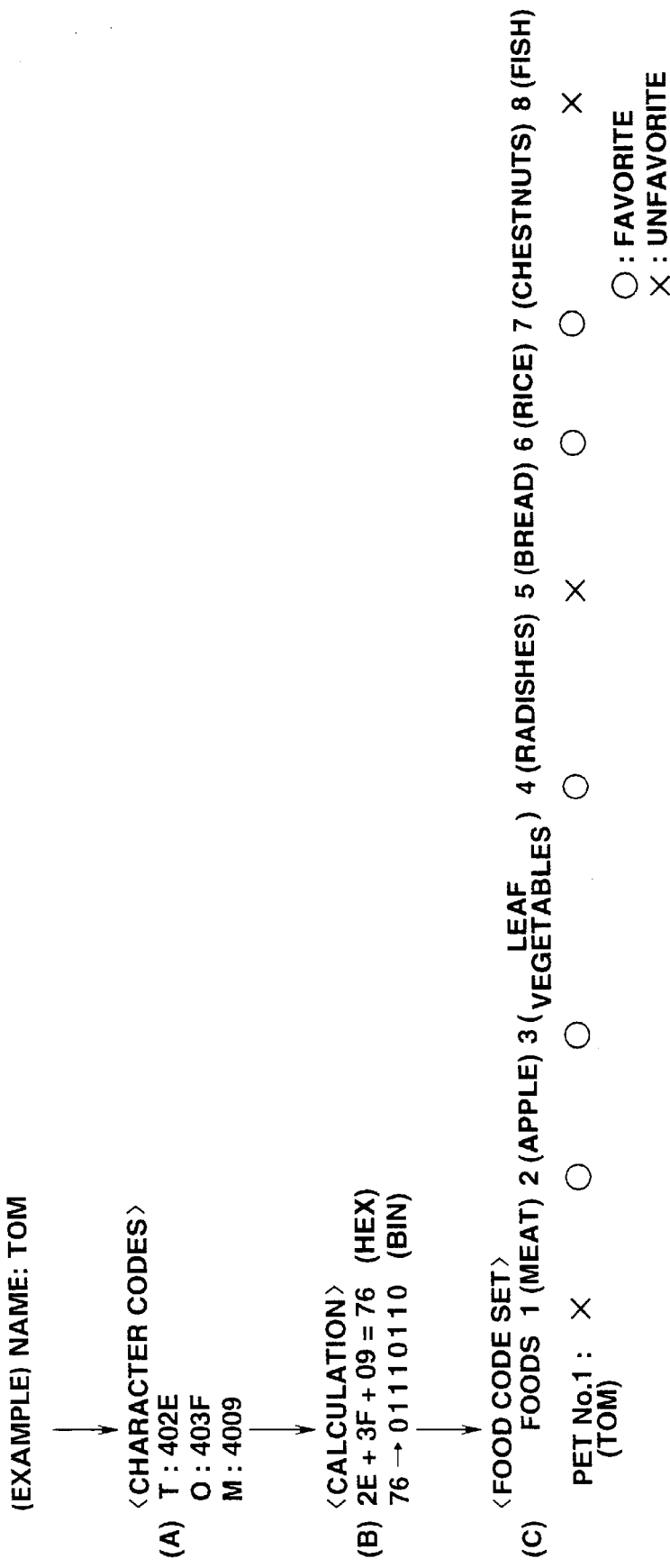
FIG. 4 is a diagram showing steps (A) to (C) showing steps for calculating codes representing foods to be stored in a pet condition register area in the RAM of the PDA employing the image display control device.

FIG. 4 shows steps (A) to (C) for calculating the food codes to be stored in the registered pet status data memory 17f. The steps in detail are as follows: a pet character targeted to be raised is registered at an initial stage of the pet raising mode and a user registers its name at "Name"; the last 2 figures in each set of the character codes representing the registered name are added by hexadecimal notation; and the addition result is converted to 8-digit binary, the food codes.

Bits of the 8-digit-binary food codes correspond to eight kinds of foods. Foods corresponding to bit "1" are registered as favorite ones, and foods corresponding to bit "0" are registered as unfavorite ones. Thus, individuality is given to the selected pet character (in this case, like and dislike in foods) on the basis of its name given by a user.

The communications section 21 is used during the communications mode. The communications section 21 connects the PDA to the other terminal, for example, a host computer such as a information provider media server S, via the public switched telephone network N. Data transmission/reception goes through the communications section 21 in accordance with commands from the CPU 11 and the other terminal. The data communications through the communications section 21 realize on-line data updating and the like. For example, the number of pet character images increases by the on-line data updating. Note that a user is not allowed to execute the character adding operation until the number of care operations (feeding actions) reaches a predetermined number. "Parameter" stored in the registered pet status data memory 17f manages the number of the care operations.

Operations of the PDA comprising thus structured image display device will now be described.

Figure 5:
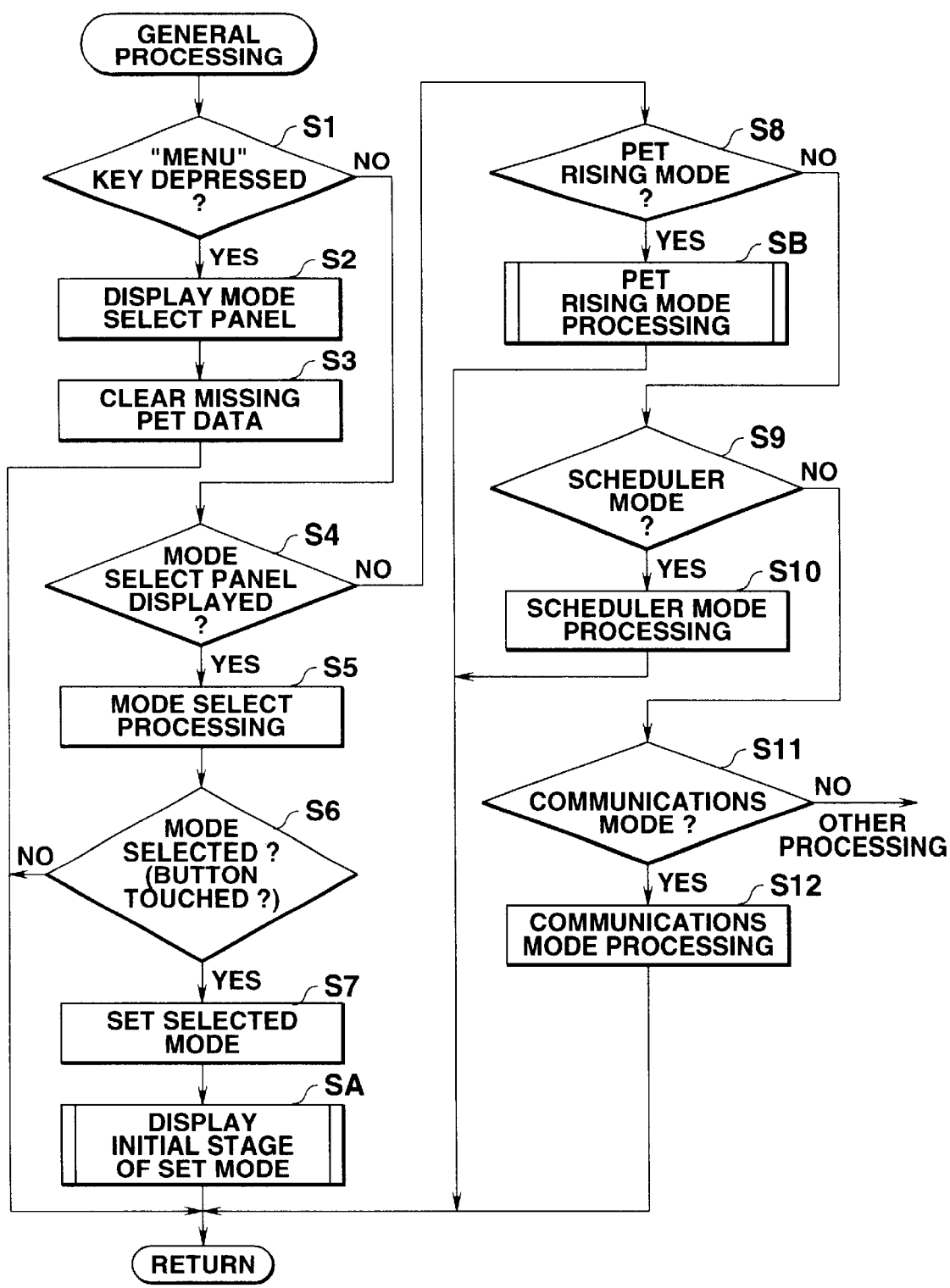
FIG. 5 is a flowchart of the general processing of the PDA employing the image display control device.

FIG. 5 is a flowchart of general processing in the PDA.

The mode select panel G1 is displayed on the LCD unit 13 in response to pressing the "Menu" key 12a on the key input section 12. On the panel G1, mode buttons (see FIG. 12A: "Pet" button 30a, "Scheduler" button 30b, "Communications" button 30c, "Set" button 30d) each linked to the pet raising mode, the scheduler mode, the communications mode, and the like are arranged (steps S1 to S2).

While the mode select panel G1 is displayed, data regarding to a missing pet stored in the missing pet data memory 17g is cleared because instructions input through the panel G1 initialize the set data (step S3).

When an arbitral mode button on the panel G1 is selected by the pen P, the operating program linking to the selected mode is invoked and a screen representing an initial stage of the selected mode opens (steps S4 to S5, S6 to S7, SA).

In the case where the pet raising mode is selected through the mode selecting steps (steps S1 to SA), pet raising mode processing (see FIGS. 7, 8, 9) starts after a screen representing an initial stage of the pet raising mode (FIG. 6) is displayed (steps S8 to SB).

If the scheduler mode is selected through the mode selecting steps (steps S1 to SA), the scheduler mode processing starts after a screen representing an initial stage of the scheduler mode is displayed (steps S9 to S10).

When the communications mode is selected through the mode selecting steps (steps S1 to SA), the communications mode processing starts after a screen of an initial stage of the communications mode is displayed (steps S11 to S12).

In the case where the other mode is selected through the mode selecting steps (steps S1 to SA), corresponding processing starts after a screen representing an initial stage corresponding to the selected mode is displayed (steps S11 to other processing).

[Pet Registration, Name Setting and Food Feeding]

FIGS. 12A to 12E show displayed operation panels and images during a pet registration/name input operation through the PDA comprising the image display device.

FIGS. 13A to 13E show displayed operation panels and images during an operation of feeding foods to the registered pet through the PDA comprising the image display device.

Figure 12B:

At the initial stage after the PDA is turned on, pressing the "Menu" key 12a of the key input section 12, as shown in FIG. 12A, causes opening of the mode select panel G1. If the "Pet" button 30a on the panel G1 displayed on the LCD unit 13 (steps S1 to S3) is touched by the pen P as shown in FIG. 12B, the CPU 11 sets preference data of the pet raising mode to the mode data memory 17b in the RAM 17, and starts the processing for displaying an initial stage screen shown in FIG. 6 (steps S4 to SA).

Figure 12C:
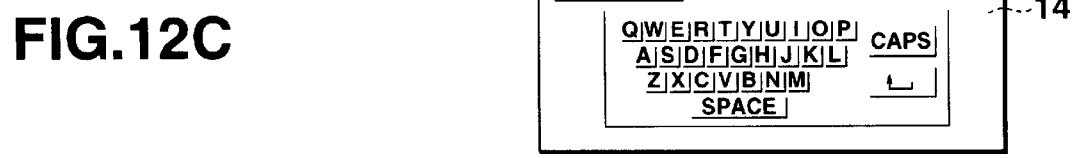

Through the processing, the CPU 11 determines that the pet raising mode is selected on the basis of the preference data stored in the mode data memory 17b. If the CPU 11 determines that no pet is registered to the registered pet status data memory 17f, the CPU 11 displays an ask-to-name image on the LCD unit 13 for a predetermined time period. The ask-to-name image includes a pet character image of a hamster corresponding to the first pet image ROM (hamster) 16a1 and a message asking a user to give a name to the displayed pet image. Then, as shown in FIG. 12C, a name input panel G3 with a virtual keyboard is displayed on the LCD unit 13 (steps A1 to A3, A4).

Figure 12D:
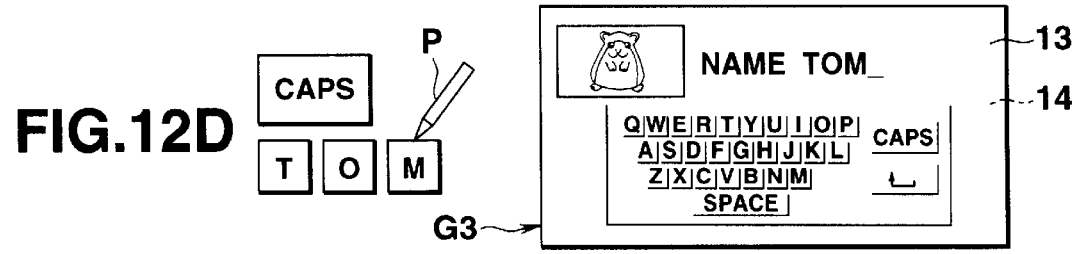

FIG. 12D exemplifies a case where the pet's name, for example, "TOM" is input by touching corresponding keys on the virtual keyboard of the name input panel G3. Depression of the "OK" key 12b on the key input section 12, as shown in FIG. 12E, allows data entry, that is, the input name "TOM" is registered as character code data to a first registration area in the registered pet status data memory 17f in the RAM (steps A5 to A6).

The input character codes are expressed by hexadecimal numerals. The last 2 figures of each of the code sets are added from each other as shown in (A) of FIG. 4. Then, the addition result is converted into 8-digit binary. The 8-digit binary corresponds to eight kinds of foods. Each digits are expressed by bit "1" or "0", and bit "1" represents "favorite" and bit "0" represents "unfavorite". Foods corresponding to bit "1" are registered as "favorite food" to the first registration area of the registered pet status data memory 17f. And foods corresponding to bit "0" are registered thereat as "unfavorite food" (steps A7, A8).

Figure 12E:
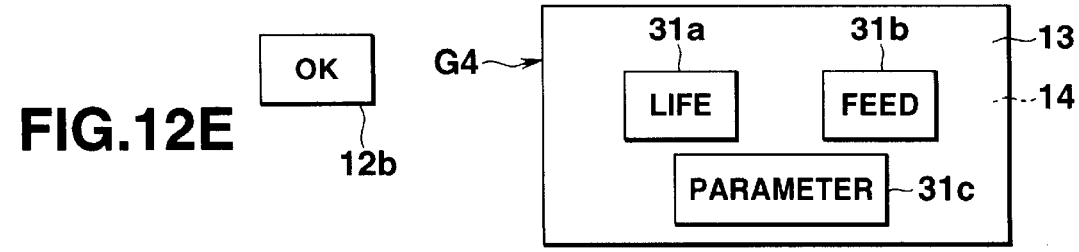

Then a pet menu select panel G4 shown in FIG. 12E is displayed on the LCD unit 13 (step A9). The displayed screen represents an initial stage for the set pet raising mode. On the panel G4, a "Life" button 31a, a "Feed" button 31b and a "Parameter" button 31c are arranged. The "Life" button 31a links to motion images of whole the pet characters in the registered pet status data memory 17f in the RAM 17. The "Feed" button 31b links to action of feeding foods to an arbitral registered pet. The "Parameter" button 31c links to display of parameters indicating the number of care actions (feeding actions) for the arbitral registered pet taken so far.

The pet raising mode processing (FIGS. 7 to 9) starts while the panel G4 is being displayed (steps S8 to SB).

When the "Life" button 31a is touched by the pen P as shown in FIG. 13F, the pet image (representing hamster "TOM") is read out from the registered pet status data memory 17f in the RAM 17. "G5" shown in FIG. 13F denotes a registered pet's life image displayed on the LCD unit 13. This image G5 is a motion image, that is, the read out pet image moves along a broken line X shown in FIG. 13F (steps B1, B2, BC, BD).

When the "Feed" button 31b on the pet menu select panel G4 is touched by the pen P, the pet's names (in this case, "TOM") registered at the registered pet status data memory 17f in the RAM 17 are read out and listed as buttons on the LCD unit 13 (steps B19, B20, BD).

The user selects by pen-touching a desired pet from the listed buttons (in this case "TOM"). In response to this action, the CPU 11 determines whether the currently selected mode is the parameter mode or not. In this case, since the CPU 11 determines that the current mode is the care mode, a pet care stage G6 enhanced for the selected pet "TOM" is displayed on the LCD unit 13 (steps B10, B11, B12, BD).

The pet care stage G6 has an image area and a food icon (button) area. In the image area, motion images expressing how the selected pet being cared are displayed. The food icon area has icons (buttons) $32_1, 32_2, 32_3, 32_4, 32_5, 32_6, 32_7$ and $32_8$ corresponding to the eight kinds of foods (meat, apples, leaf vegetables, radishes, bread, rice, chestnuts and fish (those are numbered 1 to 8 in order)).

Figure 13A:
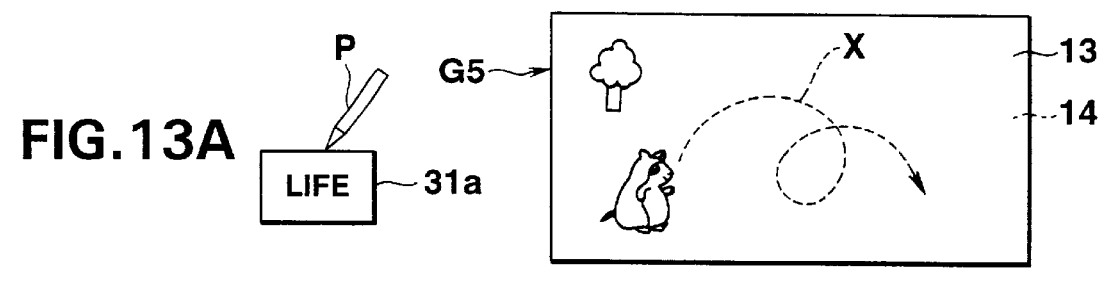
FIGS. 13A to 13E are diagrams showing an operation panel for feeding foods to the registered pet displayed on the image display control device employed in the PDA.
Figure 13B:
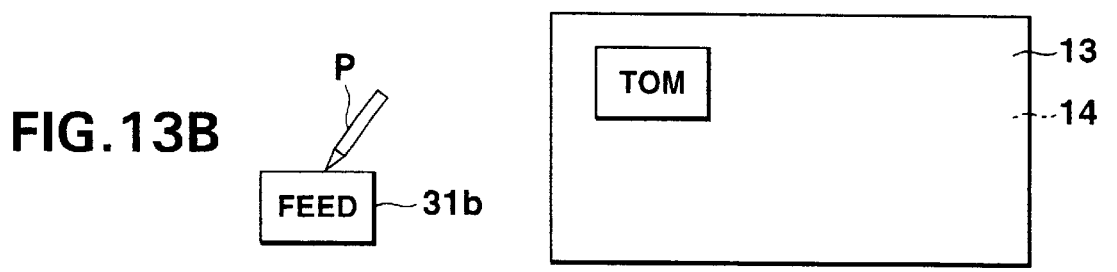
Figure 13C:
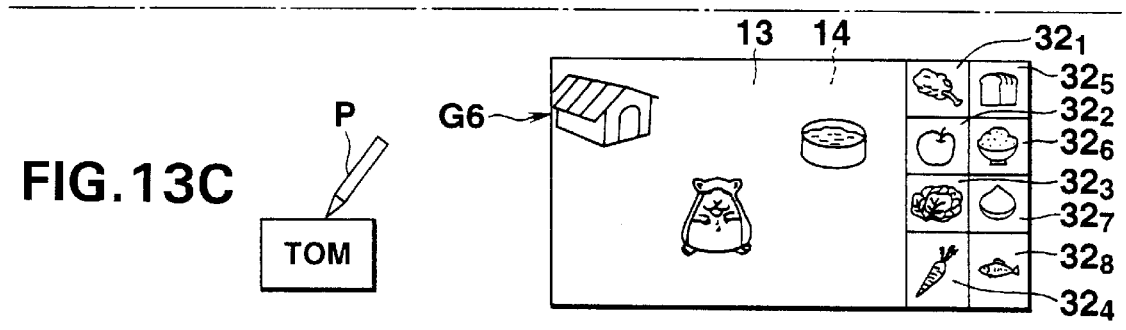
Figure 13D:
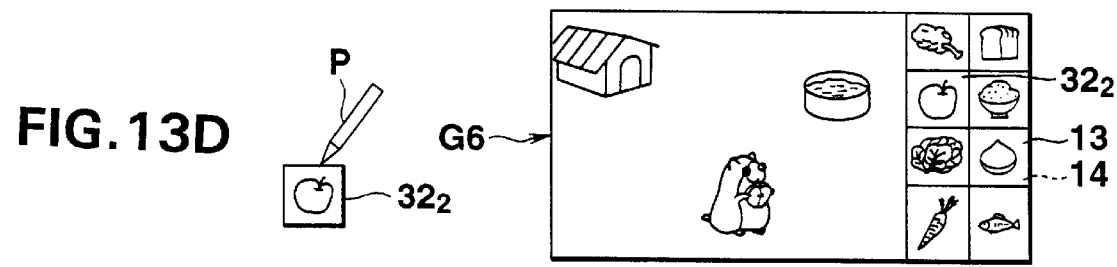

When the icon $32_2$ (an apple icon) is touched by the pen P as shown in FIG. 13D, the CPU 11 access the registered pet status data memory 17f and checks the food code set ("011 . . . " (see FIG. 4B)) corresponding to "TOM". More specifically, the CPU 11 checks the code corresponding to food No. 2 (apple), that is, the CPU 11 determines whether the second bit of the code set indicates "1" or "0". If the bit indicates "1", the CPU 11 determines that he apple is a favorite food and will be eaten by the pet. On the contrary, if the bit indicates "0", the CPU 11 determines that the apple is an unfavorite food and will not be eaten by the pet (steps B21 to B23).

In this case, the second bit of the code set corresponding to food No. 2 (apple) indicates "1" (see (B) and (C) of FIG. 4). Therefore, the CPU 11 determines that TOM likes the apple. And a motion image that TOM is eating an apple with smiling is displayed on the pet care stage G6 for a predetermined time period (steps B23 to B24).

Then, the CPU 11 access the registered pet status data memory 17f in the RAM 17 and increments the parameter data of "TOM" by 1. The CPU 11 further reads the current date and time from the current date/time data memory 17c and registers it at the registered pet status data memory 17f as "Feeding Record" (steps B25, B26).

Figure 13E:
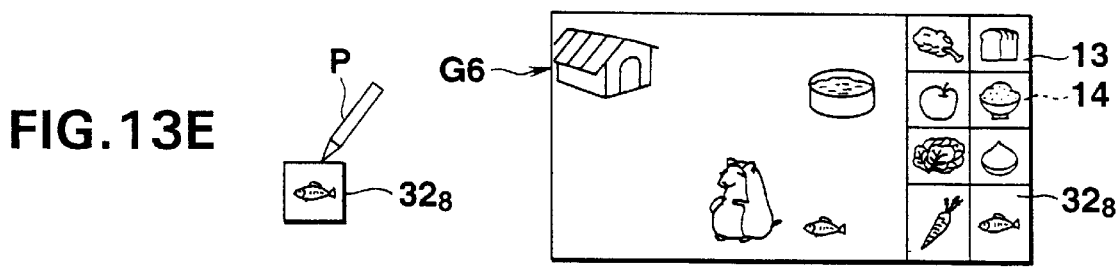

If the icon $32_8$ (fish) is selected as shown in FIG. 13E, the CPU 11 checks the eighth bit of the food code set which corresponds to food No. 8 (fish). Since the eighth bit indicates "0" (see (A) to (C) of FIG. 4), the CPU 11 determines that the pet dislikes "fish". Then, the pet character "Tom" is displayed as motion image showing displeased look without eating the fish. This motion image is displayed on the pet care stage G6 for a predetermined time period (steps B23 to B27).

Accordingly, when a user name the registered pet, the CPU automatically calculates a food code set corresponding to character codes of the input name. This food code set defines the pet's taste of food. During feeding operations, the CPU determines whether the pet likes the selected food or not. Then the CPU choose motion images of the pet which is pleased or displeased. Therefore, the pet has its own individuality in its behavior. The pet's individuality differs user by user because each user individually names his/her pet.

[Pet's Parameter List]

FIGS. 14A to 14D show procedure to open the registered pet's life image G5.

Figure 15A:
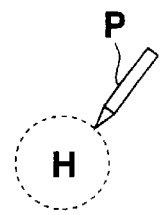
FIGS. 15A to 15C are diagrams showing procedure (pattern 1) for displaying parameter data from the registered pet's life image G5 displayed on the image display control device employed in the PDA.
Figure 15A:
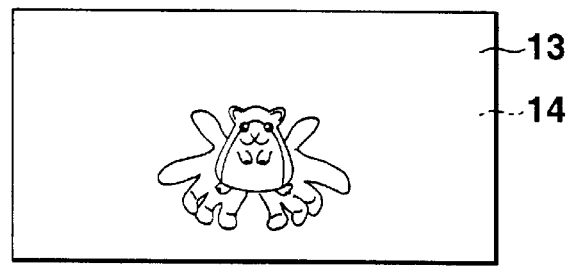
Figure 15B:
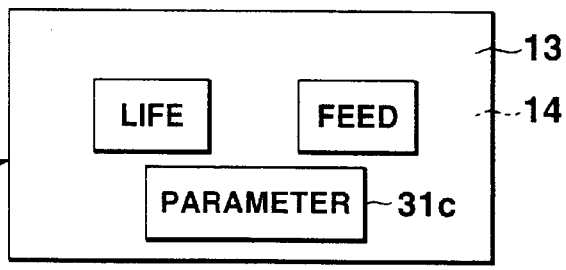
Figure 15C:
Figure 15C:
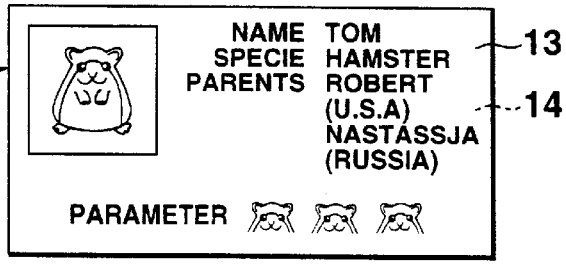

FIGS. 15A to 15C show procedure (I) to open a pet's parameter list from the registered pet's life image G5.

FIGS. 16A to 16E show the other procedure (II) to open the pet's parameter list from the registered pet's life image G5.

Figure 14A:
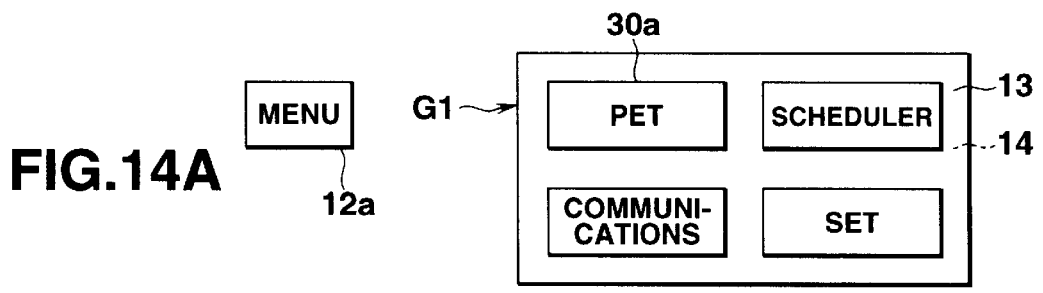
FIGS. 14A to 14D are diagrams showing procedure for displaying a registered pet's life image G5 displayed on the image display control device employed in the PDA.
Figure 14B:
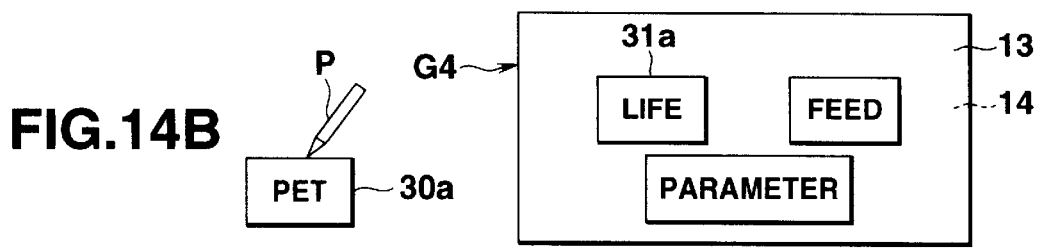
Figure 14C:
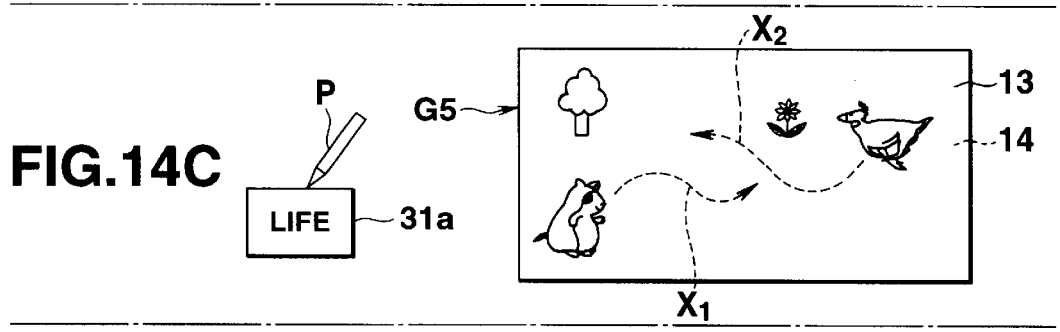
Figure 14D:
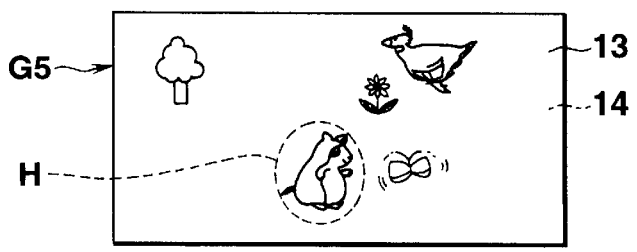

For example, "hamster" and "deer" are registered at the registered pet status data memory 17f from the pet image data ROM 16a. A user presses "Menu" key 12a on the key input section 12, and the mode select panel G1 opens (steps S1 to S3). Touching "Pet" button 30a on the panel G1 invokes the pet menu select panel G4 as shown in FIG. 14B (steps S4 to SA). Further, touching the "Life" button 31a invokes the registered pet's life image G5. When the "Life" button 31a is touched, the CPU 11 reads out the registered pet images (in this case, hamster "Tom" and deer "Mike") from the pet image data ROM 16a. The registered pet's life image G5 has the read out pet images. Those images are displayed as motion image that is, "Tom" moves along a broken like X1 and "Mike" moves along a broken like X2 (steps B1, B2, BC and BD).

A reference character "H" in FIG. 15A denotes an arbitral pet, for example, "Tom". When a user touches the moving pet image with the pen P, the CPU 11 accesses the registered pet status data memory 17f and sets a selection flag corresponding to "Tom". Then, a motion image of the selected pet ("Tom") which is playing is displayed on the LCD unit 13 (steps B3, B4, B5, BD).

If the "OK" key 12b on the key input section 12 is pressed as shown in FIG. 15B while the playing pet motion image is thus displayed, the pet menu select panel G4 opens. The panel G4 has the "Life" button 31a, the "Feed" button 31b and the "Parameter" button 31c (steps B14, B15, B16). When the "Parameter" button 31c is selected by pen-touching as shown in FIG. 15G, the CPU 11 determines whether the registered pet's status data memory 17f has a registered pet having set flag or not (steps B6, B7).

In this case, the CPU 11 determines that the flag corresponding to hamster "Tom" is set. Then, parameter data of "Tom" is read out and the read data is displayed on the LCD unit 13 as a pet parameter list G7 (steps B7, B8, BD).

Figure 16A:
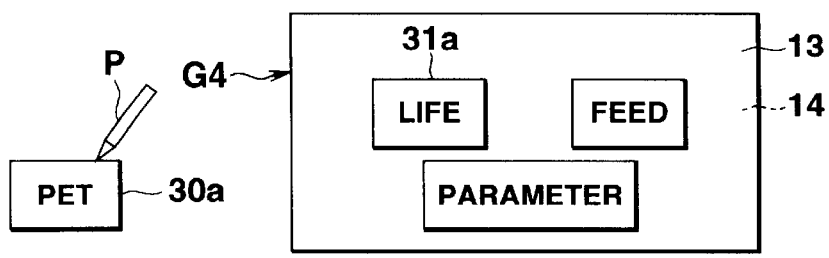
FIGS. 16A to 16E are diagrams showing procedure (pattern 2) for displaying parameter data from the registered pet's life image G5 displayed on the image display control device employed in the PDA.
Figure 16B:
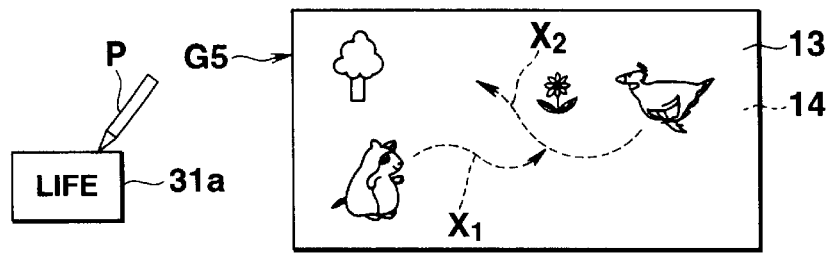
Figure 16C:
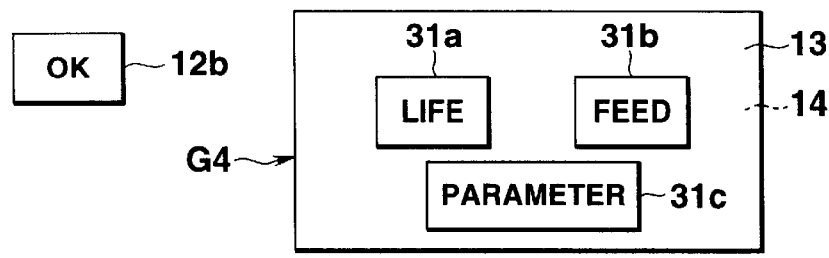
Figure 16D:
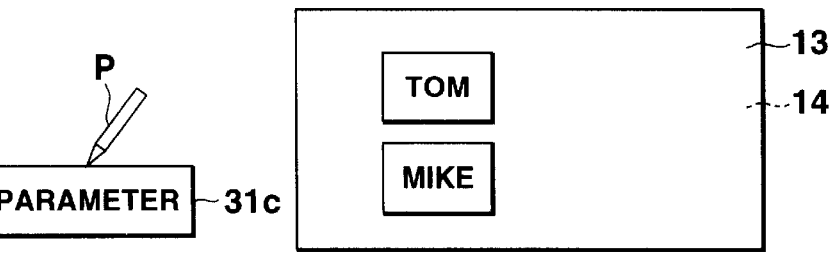

FIGS. 16A to 16B show displayed registered pet's life image G5 of "Tom" and "Mike" registered at the registered pet status data memory 17f. Procedure for displaying the image G5 is the same as that for the former case shown in FIGS. 14A to 14C, that is, the image G5 is displayed in response to selection of the "Life" button 31a on the pet menu select panel G4 (steps B1, B2, BC, BD). When the user presses the "OK" key 12b as shown in FIG. 16C without selecting the displayed pet character image, the pet menu select panel G4 is displayed (steps B14, B15, B16). If the "Parameter" button 31c on the panel G4 is selected, a list of all registered pet's name (in this case, "Tom" and "Mike") is displayed on the LCD unit 13 as shown in FIG. 16D (steps B6, B7, B9, BD). In this step, the CPU 11 determines that there is no pet having set flag in the registered pet status data memory 17f, because none of the displayed pet character image is selected on the registered pet's life image G5.

Figure 16E:
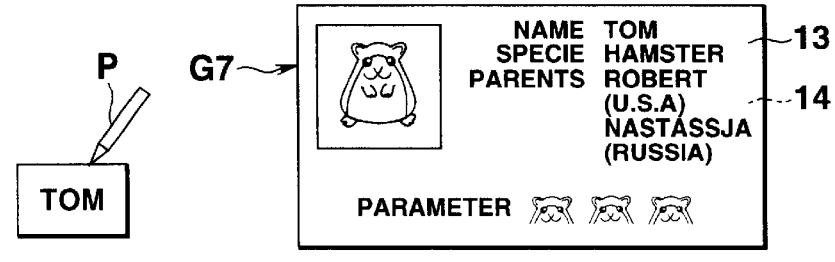

The user selects a desired pet's name button, for example, "Tom" in the list to see its parameter data sheet G7 as shown in FIG. 16E (steps B10, B11, B13, BD). The data on the parameter data sheet G7 is read out from the registered pet status data memory 17f.

Accordingly, there are two ways to see the pet's parameter data, that is, selecting desired pet from the registered pet's life image G5 or the pet's name list. In the former case, the selection flag of desired pet is set when the user selects the pet displayed on the registered pet's life image G5. Then, the parameter data of the pet to which the flag is set is read out from the registered pet status memory 17f immediately after the user presses the "Parameter" button 31c on the pet menu select panel G4. The read data is displayed on the parameter data sheet G7 (see FIGS. 14A to 15G).

In the latter case where the desired pet is not selected from the registered pet's life image G5, the pet's name list is displayed on the LCD unit 13 in response to selection of the "Parameter" button 31 from the pet menu select panel G4. The user selects the desired pet's name from the list, and parameter data of the selected pet is read out from the registered pet status data memory 17f. The read data is displayed on the parameter data sheet G7 (see FIGS. 16A to 16E).

[Seek Missing Pet]

FIGS. 17A to 17E show missing process of the pet. Frequency of the missing depends on the user's effort for bringing up the pet.

FIGS. 18A to 18E show process for seeking the missing pet.

Figure 6:
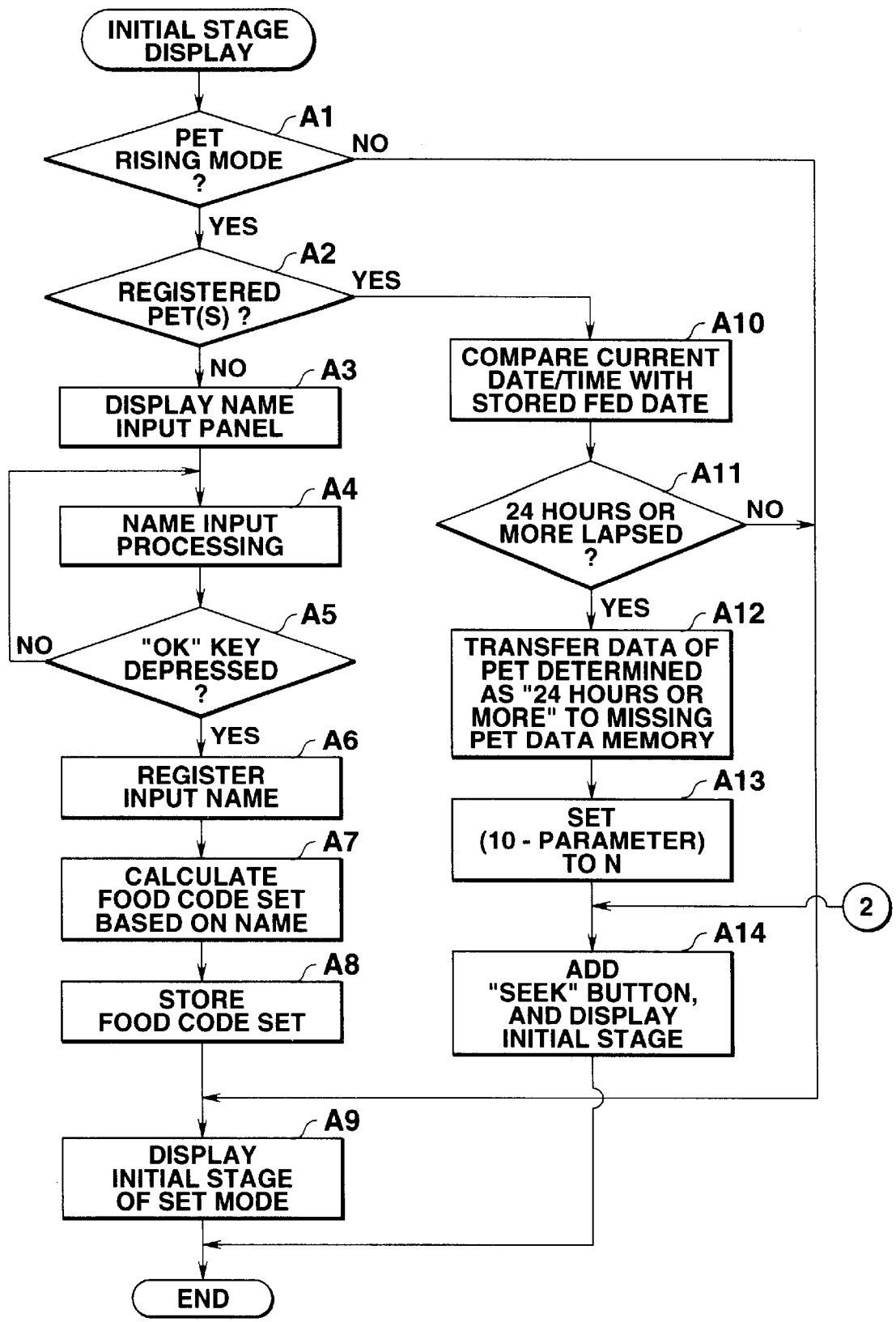
FIG. 6 is a flowchart of processing for displaying an initial stage screen in the PDA employing the image display control device.
Figure 17A:
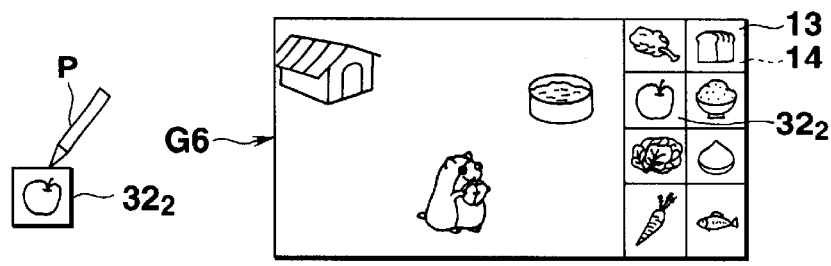
FIGS. 17A to 17E are diagrams showing process of pet missing depending on how the pet is cared for, displayed on the image display control device employed in the PDA.
Figure 17B:
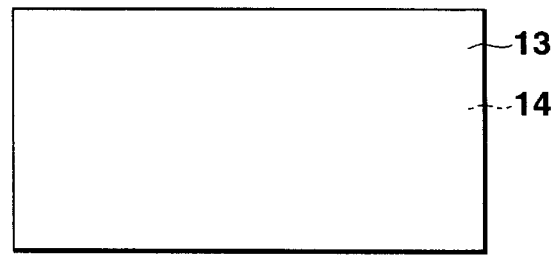
Figure 17C:
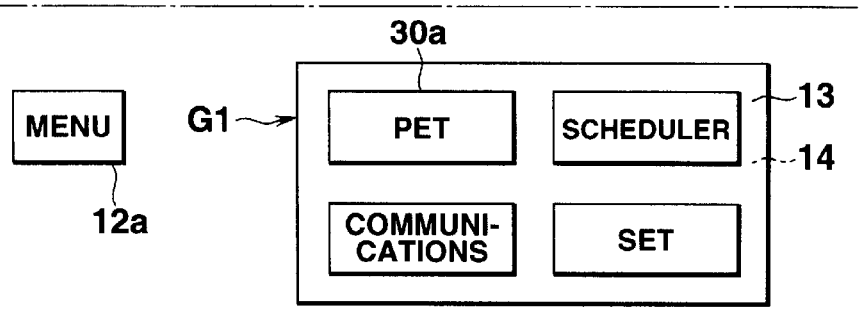
Figure 17D:
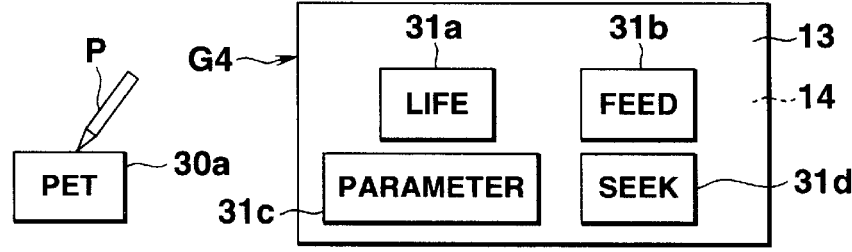

For example, FIG. 17A shows the pet care stage G6 enhanced for "Tom" and the state where the "Apple" icon $32_2$ is selected. The CPU 11 determines that the "Apple" is Tom's favorite food based on its food code corresponding to the name "Tom". The CPU 11 displays image of Tom eating the apple with smiling on the image area of the pet care stage G6. The Tom's parameter data is incremented by 1 and the current date and time is recorded in "Feeding Record" (steps B21 to B26). FIG. 17B shows a display screen of the LCD unit 13 during the apparatus is not activated. In this case, it has been at least 24 hours since the pet rising mode is terminated. Then, the apparatus is turned on and the mode select panel G1 is opened as shown in FIG. 17C in response to the depression of the "Menu" key 12 a on the key input section 12 (steps S1 to S3). Then the pet rising mode is activated again by selecting the "Pet" button 30a from the mode select panel G1 (steps S4 to SA), and the processing for displaying the initial stage shown in FIG. 6 is executed. The CPU 11 accesses the registered pet status data memory 17f and determines that the memory 17f has the registered pets. The CPU 11 compares the date and time when the latest feeding action was taken with the current date and time read out from the current date/time memory 17c. Then, the CPU 11 determines whether it has been at least 24 hours since the time when the latest feeding action was taken (step A1, A2, A10, A11).

If the CPU 11 determines based on the comparison that there is "Tom" whose care date is at least 24 hours ago since the current date and time, the status data of "Tom" stored in the registered pet status data memory 17f is transferred to the missing pet data memory 17g (steps A11 to A12).

The CPU 11 subtracts 10 from the pet's parameter, that is, the number of times of feeding actions. The result N is stored in the pet-finder data memory 17d as the number of trials for seeking necessary for find "Tom" (step A13).

The pet menu select panel G4 to which a "Seek" button 31d is added is displayed on the LCD unit 13. The panel G4 is an initial screen of the pet rising mode containing missing pet (step A14).

Figure 17E:
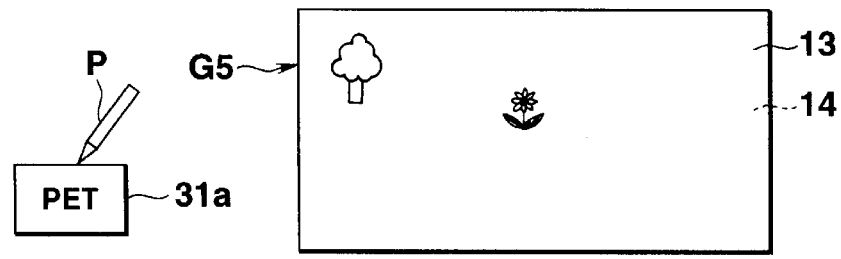

When the user selects the "Life" button 31a from the pet menu select panel G4 having the additional "Seek" button 31d after the data of "Tom" is transferred to the missing pet data memory 17g, the registered pet's life image G5 without "Tom" is displayed on the LCD unit 13b as shown in FIG. 17E (steps B1, B2, BC, BD).

In response to depression of the "OK" key 21b on the key input section 21 during the registered pet's life image G5 in case of the missing pet is being displayed, the pet menu select panel G4 is opened. As shown in FIG. 18F, the panel G4 has the "Seek" button 31d in addition to the "Life" button 31a, the "Feed" button 31b and the "Parameter" button 31c. The addition of the "Seek" button 31d depends on determination by the CPU 11 as follows. The CPU 11 determines that the pet is missing, because the missing pet data memory 17g has data of the missing pet (steps B14, B15, B16, B17, B18, BD).

When the "Seek" button 31d on the pet menu select panel G4 is touched, the number of seek trial N stored in the pet-finder data memory 17d is decremented by 1. Then, the CPU 11 determines whether the number of trial N is reduced to 0 or not (steps B28, B29, B30).

For example, if the number of seek trial N is 1, the CPU 11 determines that the N is not 0, and displays an unfound-notice image G8 having a back image of "Tom" and a message "Not Found" on the LCD unit 13 for a predetermined time period. The image G8 is stored in the pet image data ROM 16a. Then, the pet menu select panel G4 having the "Seek" button 31d is redisplayed on the LCD unit 13 as shown in FIG. 18H (steps B30, B34, A14).

Figure 18A:
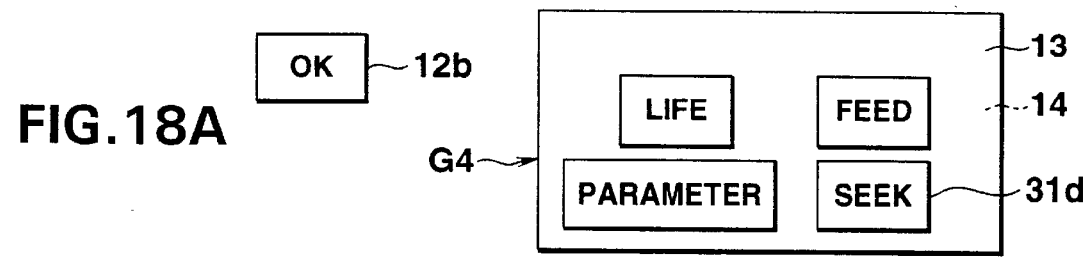
FIGS. 18A to 18E are diagrams showing process of finding the missing pet displayed on the image display control device employed in the PDA.
Figure 18B:
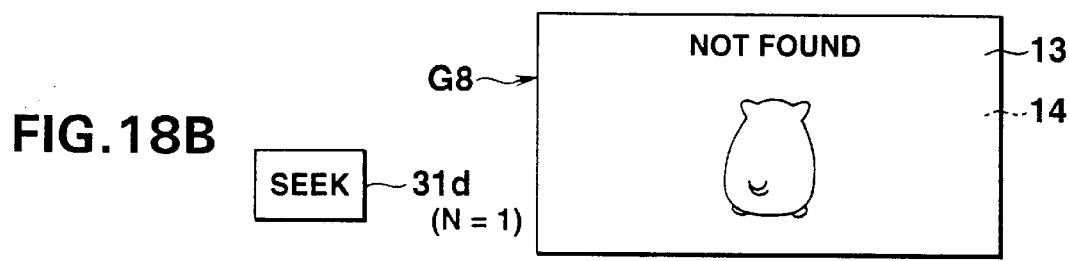
Figure 18C:
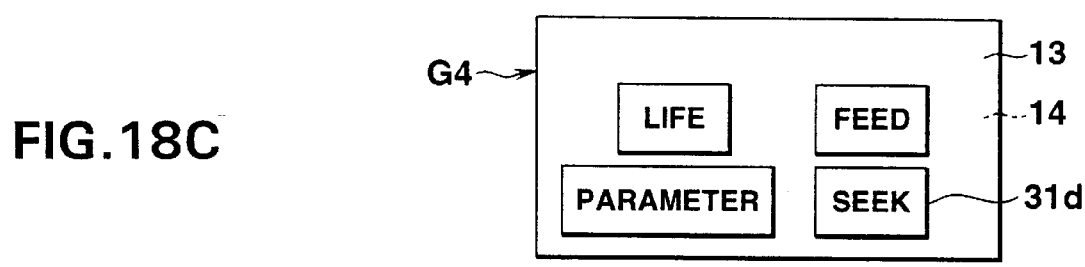
Figure 18D:
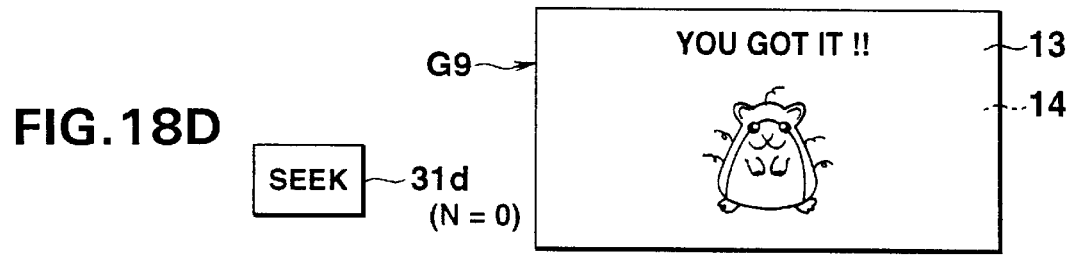
Figure 18E:
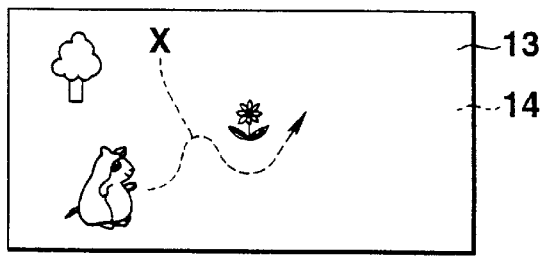

Then the number of seek trial N is further decremented when the "Seek" button 31d on the redisplayed pet menu select panel G4 is touched by the pen P as shown in FIG. 18D. The CPU determines that the number of seek trial is reduced to 0, and transfer back the data of Tom from the missing pet data memory 17g to the registered pet status data memory 17f (steps B28, B29, B30, B31).

A found-notice image G9 having an image of tired Tom and a message of "You Got It!!" is read out from the pet image data ROM 16a and is displayed on the LCD unit 13 for a predetermined time period. Then, the motion image of the pet is displayed as FIG. 18E. The motion image shows the pet moving along a broken arrow X in FIG. 18E (steps B32, B33, BD).

If the pet rising mode with the missing pet is terminated once, the data of the missing pet stored in the missing pet data memory 17g is cleared. The user has to register a new pet when the mode select panel G1 is displayed on the LCD unit 13 again by pressing the "Menu" key 12a (steps S1 to S3).

Accordingly, if the registered pet status data memory 17f has a pet which was fed at least 24 hours ago, its status data is transferred to the missing pet data memory 17g, and the pet image does not appear on the registered pet's life image G5, the pet care stage G6, and the parameter data sheet G7. Moreover, the "Seek" button 31*d* is added to the pet menu select panel G4. Each time the "Seek" button 31*d* is touched, the number of seek trial N, which is in inverse proportion to the number of operations for taking care of the pet done so far, stored in the pet-finder data memory 17*d* is reduced. When N is not 0, the unfound-notice image G8 is displayed on the LCD unit 13. When N is equal to 0, the status data of the missing pet is transferred back to the registered pet status data memory 17*f*, and the found-notice image G9 is displayed on the LCD unit 13. The found pet is allowed to be displayed on the registered pet's life image G5, the pet care stage G6 and the parameter data sheet G7. Thus, the user can experience more realistic rising simulation because the pet disappears when the user neglects feeding or level of seeking depends on the feeding activities done so far.

[Hidden Character Image/Hidden Guidance]

FIGS. 19A to 19E show pet character display sequence corresponding to time.

FIGS. 20A to 20E show guidance display procedure corresponding to a hidden character image appearance.

Figure 19A:
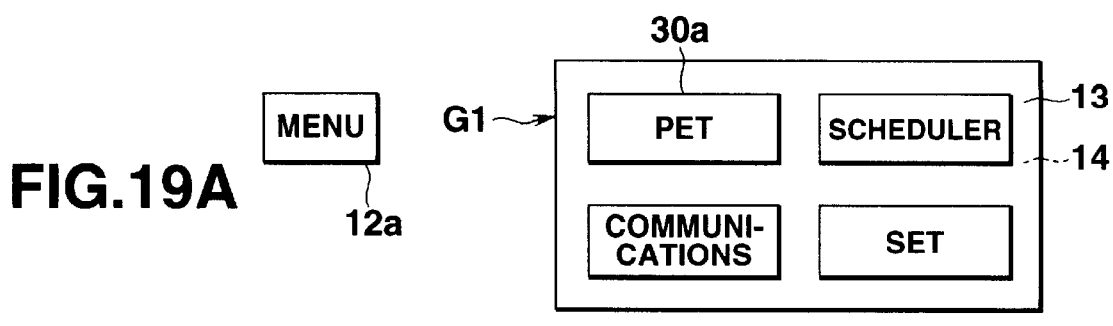
FIGS. 19A to 19E are diagrams showing process of displaying images which appear in accordance with time, in the image display control device employed in the PDA.
Figure 19B:
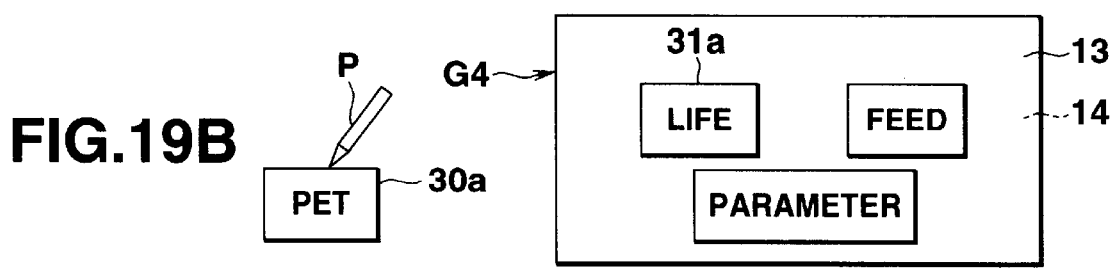

The mode select panel G1 is displayed on the LCD unit 13 in response to depression of the "Menu" key 12*a* on the key input section 12 as shown in FIG. 19A (steps S1 to S3). The pet rising mode is invoked with opening the pet menu select panel G4 after the "Pet" button 30*a* on the mode select panel G1 is touched by the pen P as shown in FIG. 19B (steps S4 to SA, S8, SB). If the "Life" button 31*a* on the pet menu select panel G4 is touched at, for example, 13:59 (present time), a pet character image corresponding to the time is read out from the pet image data ROM 16*a*. The read image is displayed on the registered pet's life image G5 as a motion image (steps B1, B2, BC).

Figure 10:
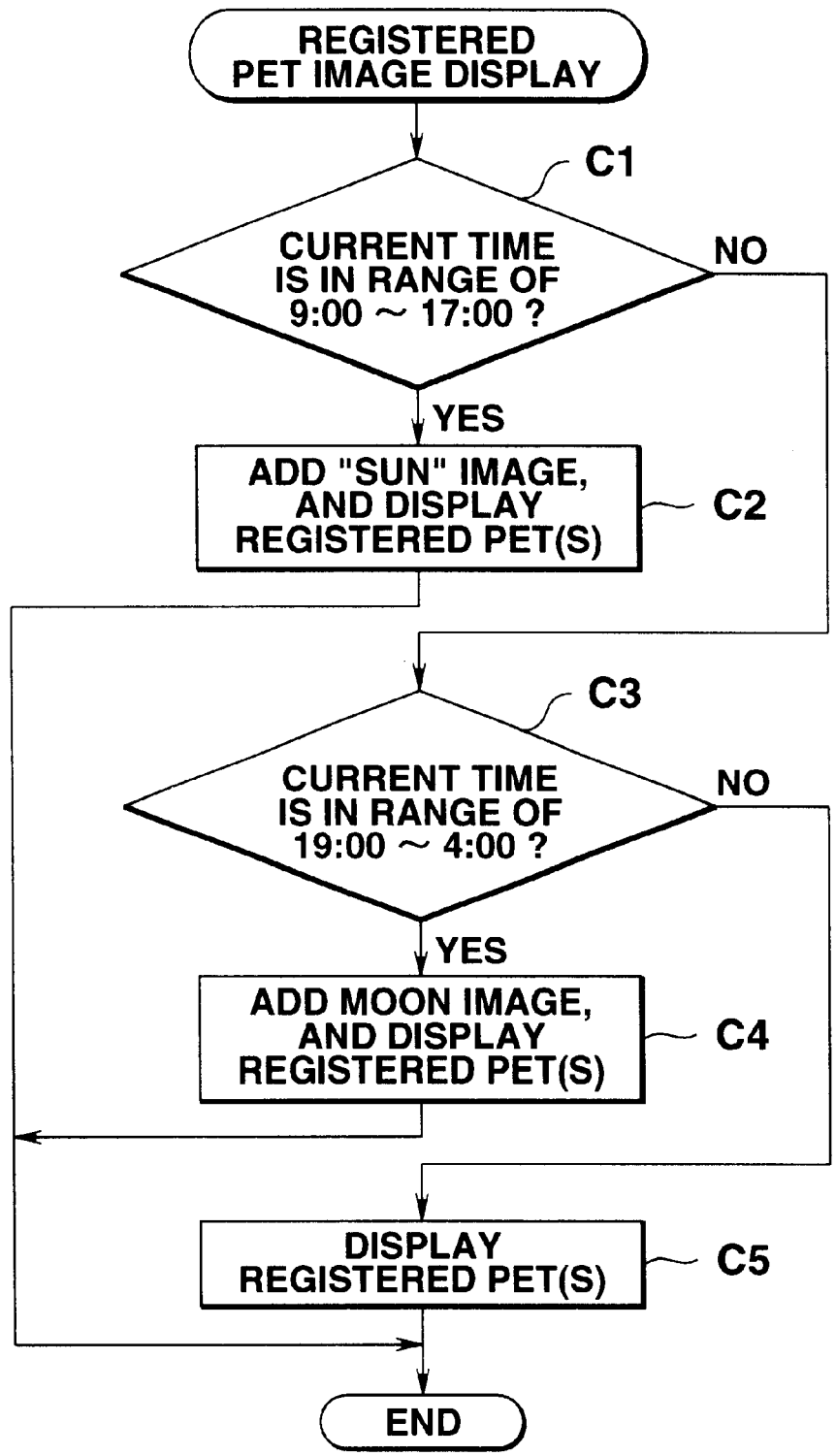
FIG. 10 is a flowchart of registered pet display processing during the pet rising mode (pattern 1) in the PDA employing the image display control device.
Figure 19C:
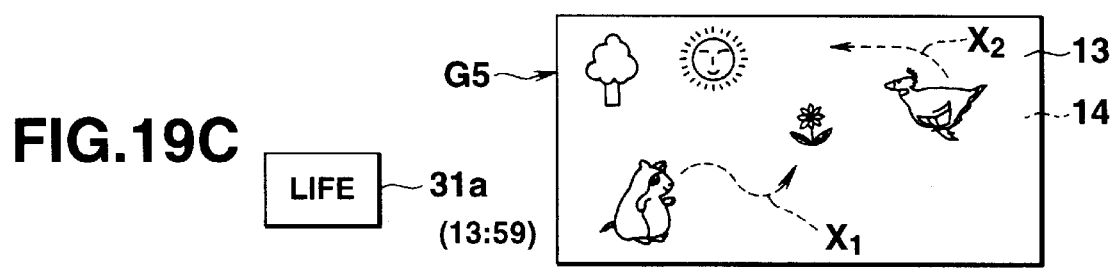
Figure 19D:
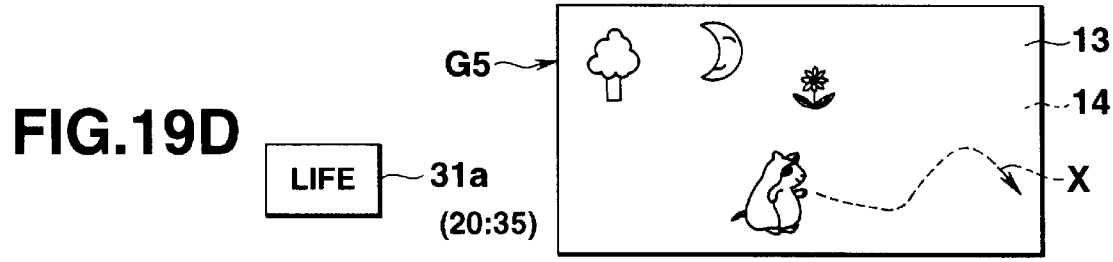

In this case, if the CPU 11 determines in the registered pet display processing shown in FIG. 10 that the current time (13:59) read out from the current date/time data memory 17*c* is in a range of day time (9:00–17:00), a character image of "Sun" is added to the registered pet's life image G5 as shown in FIG. 19C (steps C1 to C2).

If the current time read out from the current date/time data memory 17*c* is, for example, 20:35, the CPU 11 determines that the current time is in a range of night time (19:00–4:00), and a character image of "Moon" is added to the registered pet's life image G5 (steps C3 to C4).

If the current time is in a time range other than the above time ranges, usual registered pet's life image G5, that is, a motion image of the registered pet character is displayed (step C5).

Figure 19E:
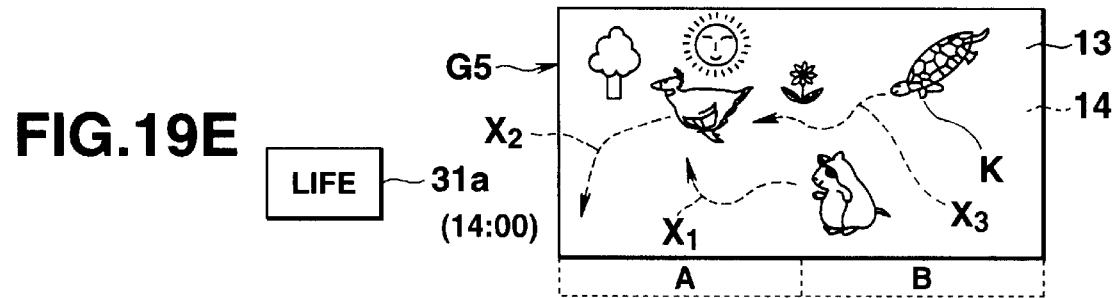

FIG. 19E shows the registered pet's life image G5 when the "Life" button 31*a* on the pet menu select panel G4 is touched at "14:00" (steps B1, B2, BC (C1, C2)). The character image of "Sun" is added to the registered pet's life image G5 (step BD). The CPU 11 determines in the display processing shown in FIG. 11 that the registered pet image is displayed on the image G5 and minute of the current time is "00". Because the minute of the current time is "00", a character image of "tortoise" is read out from the pet image data ROM 16*a* and is added to the registered pet's life image G5 for a predetermined time period. The displayed character images are shown as motion images. As shown in FIG. 19E, the hamster image moves along a broken arrow X1, the deer image moves along a broken arrow X2, and the tortoise image moves along a broken arrow X3 (steps D1, D2, D3, D4).

The registered pet's life image on which the hidden character image, that is, tortoise is added, has areas (A: left, B: right) dividing the screen into two in the landscape direction. One of the areas is set as an active area. The active area is switched each other in accordance with depression of the "OK" key 12*b*. Data indicating which area is current active area is stored in the area data memory 17*e* in the RAM 17.

Figure 20E:
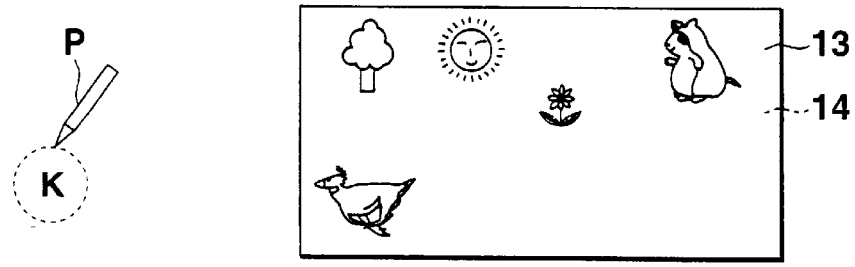

FIG. 20E exemplifies a case where the current date is "July 20" and the hidden character "Tortoise" K is displayed in the area A which is set as the active area (steps B1, B2, BC, BD (D1 to D4)). If the Tortoise image K is touched by the pen P as shown in FIG. 20G, the CPU 11 determines that the touched Tortoise image K is in the active area A and the current date (July 20) coincides with specific date stored in the specific date guidance data ROM 16*b*1. Guidance data corresponding to the specific date (July 20) is read out from the specific date guidance data ROM 16*b*1 and its massage "Today is Marine Day. Let's go to sea!" is displayed on the LCD unit 13 as a specific date guidance image G(steps B35, B36, B37, B38).

If the CPU 11 determines, when the Tortoise image K in the active area A is touched, that the current date coincides with usual date stored in the usual date guidance data ROM 16*b*2, guidance data corresponding to usual dates is read out from the usual date guidance data ROM 16*b*2 and its message is displayed on the LCD unit 13 as an usual guidance image (steps B35, B36, B37, B39).

Then, if the "OK" key 21*b* on the key input section 21 is depressed, the set active area stored in the area data memory 17*e* is switched from A to B (or B to A), and the normal pets list appears (steps B40, B41, B42, BD).

FIG. 20D exemplifies a case where the current date is "July 20", the current time is "15:00", and the area B is set to active area in which the hidden character tortoise image K is displayed. If the tortoise image K which is not in the active area B is touched by the pen P as shown in FIG. 20J, the specific date guidance corresponding to July 20 does not appear. In this case, the normal pets list appears (steps B35, B36, B42, BD).

Accordingly, the character images of "Sun" or "Moon" is added to the registered pet's life image G5 on which the motion images of the registered pet are displayed. Moreover, when minute of the current time is "00", the hidden character motion image (in this case, tortoise image) is added to the registered pet's life image G5 for a predetermined time period. If the tortoise image is touched by the pen P when it is in the switchable active area, the CPU 11 determines whether the current date coincides with specific date stored in the hidden guidance data ROM 16*b*. If the current date coincides with the specific date, the specific guidance image G10 corresponding to the specific date appears. If the current date does not coincide with the specific date, the usual date guidance image appears. Therefore, variant results appear after the user operates the registered pet's life image G5. This gives fun of unexpectability to the game.

According to the PDA comprising the image display device having the above described structure, a user select hamster image as a pet from the pet image data ROM 16*a* in the ROM 16. The user gives the hamster image his name, for example, "Tom". 8-digit code set corresponding to eight kinds of food is produced based on character codes of "Tom". The set is comprised of 2-bit codes, and each bit indicates "like" or "dislike" (1: like, 0: dislike). When the user feeds food to the pet, the CPU 11 determines that the pet likes the fed food or not based on the corresponding code. If the CPU 11 determines that the pet likes the fed food, the image of the pet which eating the fed food with smiling is displayed in the pet care stage G6. On the contrary, it is determined that the pet dislikes the fed food, the image of the pet having displeased look without eating the fed food is displayed in the pet care stage G6. Thus, individuality is provided to the pet, because the pet's like/dislike of food depends on its name given user by user. In other words, even if a plurality of users select the same kind of pet and feed the same food to them, the pets react individually.

Figure 7:
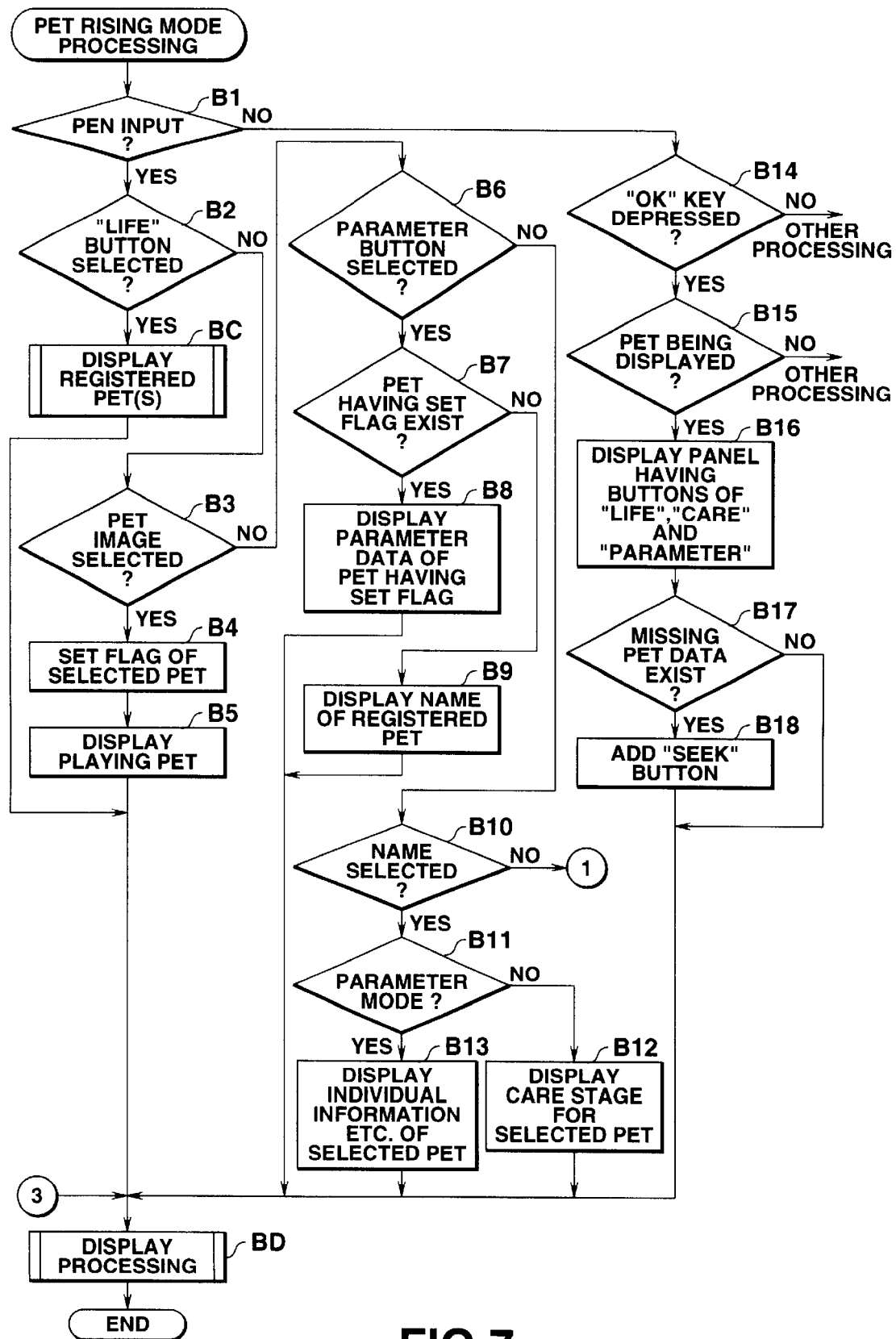
FIG. 7 is a flowchart of processing for pet raising mode (pattern 1) in the PDA employing the image display control device.
Figure 8:
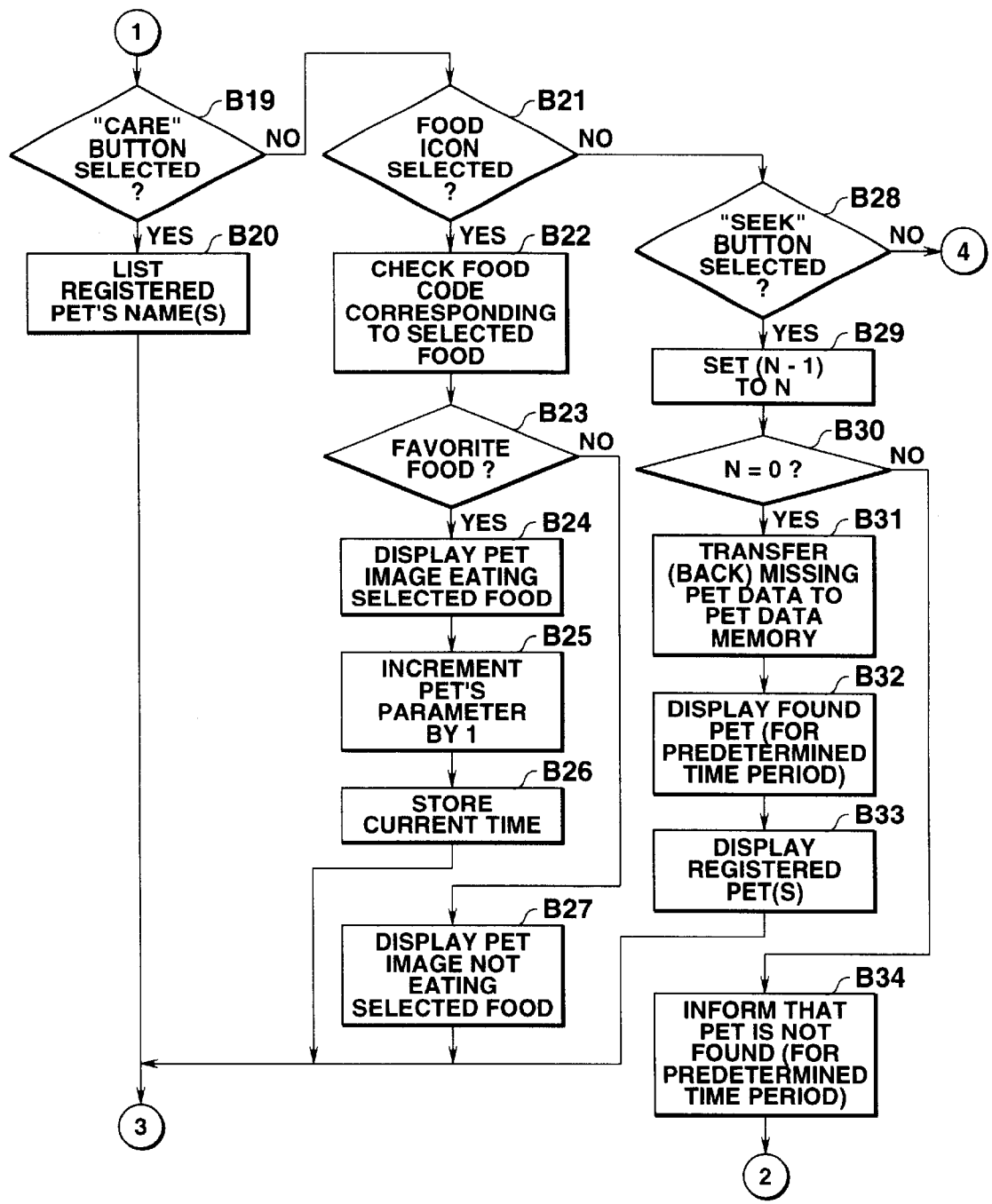
FIG. 8 is a flow chart of processing for pet raising mode (pattern 2) in the PDA employing the image display control device.
Figure 9:
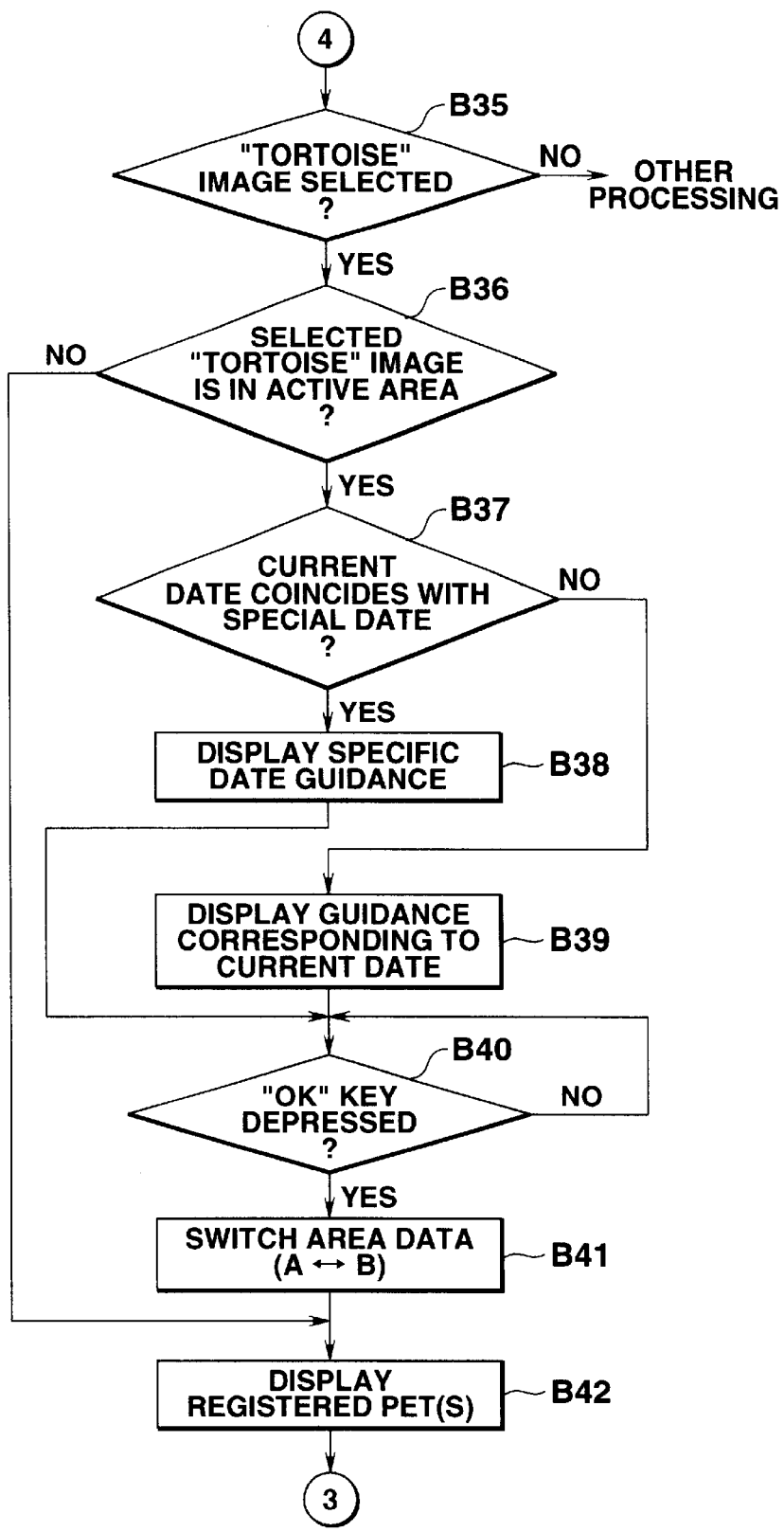
FIG. 9 is a flow chart of processing for pet raising mode (pattern 3) in the PDA employing the image display control device.
Figure 11:
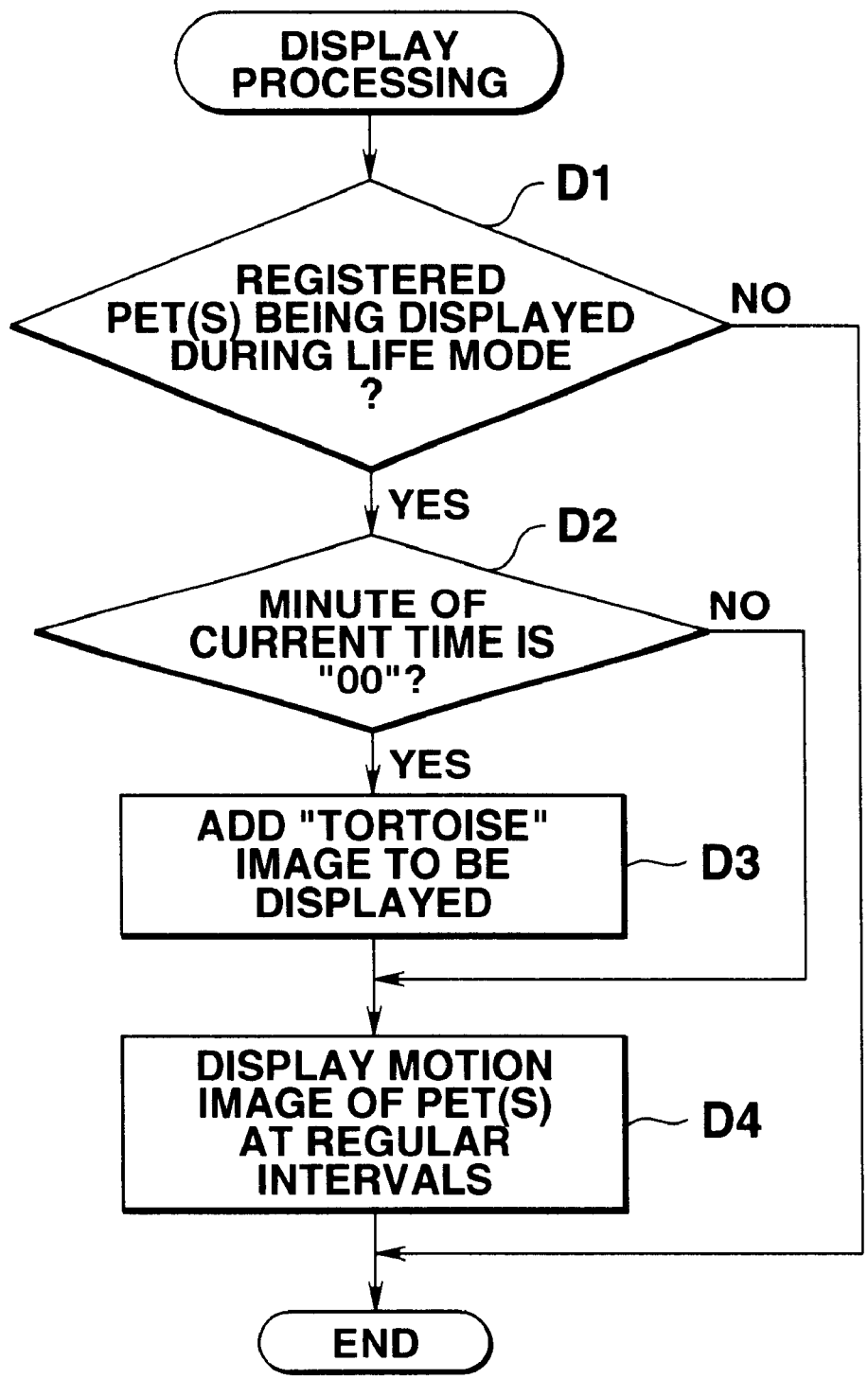
FIG. 11 is a flowchart of display processing during the pet rising mode (pattern 1) in the PDA employing the image display control device.

The general processing shown in FIG. 5, the processing for displaying initial stage shown in FIG. 6, the pet rising mode processing shown in FIGS. 7 to 9, the registered pet display processing shown in FIG. 10, and the display processing shown in FIG. 11 may be realized by a computer program. The program may be stored in an external storage medium 20 such as a memory card (a ROM card, a RAM card, or the like), a magnetic disk (a floppy disk, a hard disk, or the like), an optical disk (a CD-ROM, a DVD, or the like), a semiconductor memory device, or the like. A computer has a media reader 19 which reads the program stored in the external storage medium 20. The read program controls operations for pet rising simulation and realizes the same functions as those described in the above embodiment.

As described in the above embodiment, the image display control device for displaying on display means (13 in FIG. 1) living thing images sequentially read out from living thing image storage means (16 in FIG. 2) storing sets of living thing images each set representing sequential behavior of a living thing, said image display control device comprises discrimination data setting means (17f in FIG. 3) for setting discrimination data to each set of the living thing images stored in said living thing image storage means; and display control means (B22, B23 in FIG. 8; I, J in FIG. 13) for controlling said display means so that the sequential behavior of the living thing is displayed thereon by displaying the living thing images included in the set in accordance with the discrimination data set by said discrimination data setting means.

In the above image display control device, the discrimination data comprises character strings ((A) to (C) of FIG. 4) indicating name or address which is provided to the corresponding living thing. Moreover, the image display control device further comprises care means (B21 in FIG. 8) for caring for the living thing represented by the living thing images displayed on said display means, wherein said display control means comprises means (B22, B23 in FIG. 8) for controlling said display means to display the sequential behavior of said living thing when said living thing image is cared for by said care means.

As described in the other embodiment, the image display control device comprising image storage means (16 in FIG. 2) storing images, and display means (13 in FIG. 1) for displaying the images stored in said image storage means, said image display control device, comprises: image selecting means (B4 in FIG. 7) for selecting an image from the images displayed on said image display means; instruction means (B6 in FIG. 7) for giving an instruction to display individual information assigned to each of the images; first display control means (B8 in FIG. 7; G in FIG. 15) for displaying on said display means the individual information assigned to a selected image in the case where the image has been already selected by said image selecting means when said instruction means gives the instruction for displaying the individual information; and second display control means (B13 in FIG. 7; E in FIG. 16) for displaying on said display means information demanding to input individual information in the case where an image has not been selected by said image selecting means when said instruction means gives the instruction for displaying the individual information.

The above image display control device further comprises means (B5 in FIG. 7) for reading out an image selected by said image selecting means from said image storage means to display the read image on said display means.

As described in the other embodiment, the image display control device comprising image storage means (16 in FIG. 2) for storing a plurality of living thing images and image display means (13 in FIG. 1) for displaying at least one of said plurality of living thing images stored in said image storage means, said image display control device comprises additional image display control means (D3 in FIG. 11; E in FIG. 19) for controlling said image display means to display an additional living thing image which differs from said living thing images being displayed on said image display means and is stored in said image storage means when predetermined conditions are fulfilled.

The above image display control device further comprises: additional image selecting means (B3 in FIG. 9; A, B in FIG. 20) for selecting the additional living thing image displayed on said image display means; and message display control means (B38, B39 in FIG. 9; B in FIG. 20) for displaying on said image display means a message with the additional living thing image when said additional image selecting means selects the additional living thing image. In this image display control device, said additional image display control means comprises means (D4 in FIG. 11; E in FIG. 19) for controlling said image display means so as to display the additional living thing image for a predetermined time period when the predetermined conditions are fulfilled. Furthermore, said additional image display control means comprises means (D4 in FIG. 11; E in FIG. 19) for controlling said additional image display control means so as to move the displayed additional living thing image in a display area on said image display means when the predetermined conditions are fulfilled.

In the other embodiment, the image display control device comprising image storage means (16 in FIG. 2) storing a plurality of living thing images and display means (13 in FIG. 1) for displaying said plurality of living thing images, said image display control device comprises: care means (B19, B21 in FIG. 8) for caring for said plurality of living thing images displayed on said image display control means; non-display control means (A11, A12 in FIG. 6) for controlling said display means to vanish the displayed living thing images when predetermined care conditions of the living thing image are not fulfilled.

The above image display control device further comprises: condition setting means (A13 in FIG. 6) for setting a re-display condition for redisplaying the vanished living thing image; and re-display control means (B28 to B31 in FIG. 8) for re-displaying the vanished living thing image on said display means in accordance with the re-display condition set by said condition setting means. Moreover, the image display control device further comprises: degree data storage means (B25 in FIG. 8) for storing degreed data representing degree of care by said care means; and redisplay designation means (B28 in FIG. 8) for designating re-display of the vanished living thing image, wherein said condition setting means sets a value corresponding to the degree of care represented by degree data stored in said degree data storage means (A13 in FIG. 6); said re-display designation means updates (B29 in FIG. 8) the value set by said condition setting means; and said re-display control means re-displays the vanished living thing image when the updated value reaches a predetermined value. Furthermore, the image display control device further comprises: search means (B28 in FIG. 8) for searching the vanished living thing image; and search result display means (B32, B34 in FIG. 8; G, I in FIG. 18) for displaying on said display means a result of the search.

What is claimed is:

1. An image display control device which controls display means to display at least one of image sets each representing one of a plurality of kinds of living things, comprising:

living thing image storage means for storing said image sets each including a plurality of images for representing sequential behavior of a living thing;

discrimination data setting means for setting discrimination data being associated with the living things respectively; and display control means for reading out one of said image set from said living thing image storage means in accordance with the discrimination data set by said discrimination data setting means, and for controlling said display means to sequentially display the images in the read-out image set.

2. The image display control device according to claim 1, wherein the discrimination data represents personal information such as a name and an address assigned to the living things respectively.

3. The image display control device according to claim 1 further comprising care means for allowing a user to care for the living thing represented by the set of the images displayed on said display means, wherein said display control means comprises behavior control means for controlling said display means to sequentially display said set of the images representing the sequential behavior when said living thing is cared through said care means.

4. An image display control method for controlling display means to display at least one of a plurality of image sets each representing one of a plurality of kinds of living things, comprising the steps of:

setting discrimination data being associated with the living things respectively; and accessing living thing image storage means which stores the plurality of said image sets each having plural images of the living thing for representing a sequential behavior, in accordance with the discrimination data set by said setting step, of sequentially reading out said plural images in one of said plurality of image sets, and of controlling said display means to sequentially display the read-out images.

5. The image display control method according to claim 4, said discrimination data representing personal information such as a name and an address assigned to said living thing.

6. The image display control method according to claim 4 further comprising the step of caring for the living thing represented by the living thing image displayed on said display means, wherein said caring step comprises the step of controlling said display means to sequentially display said images for the sequential behavior when said living thing is cared by said caring step.

7. A computer readable medium storing a program which causes a computer to control display means to display at least one of a plurality of living thing images, said program causes said computer to:

set discrimination data being associated with said plurality of living things respectively;

access living thing image storage means which stores image sets each corresponding to one of said plurality of living things while including a plurality of images for representing a sequential behavior of the living thing, in accordance with the set discrimination data; and sequentially read out said plurality of images of one of said image sets, and control said display means to sequentially display said images in said read-out image set.

8. An image display control device which controls display means to display at least one of a plurality of living thing images stored in image storage means, comprising:

first display control means for controlling said display means to display an additional living thing image other than the living thing image which has been displayed on said display means, when a predetermined condition is satisfied while said living thing image is being displayed on said display means; and second display control means for controlling said display means to display said additional living thing image with motion.

9. The image display control device according to claim 8 further comprising:

image designation means for designating said additional living thing image; and third display control means for controlling said display means to display a message by said living thing represented by said additional living thing image.

10. An image display control method for controlling display means to display at least one of a plurality of living thing images stored in image storage means, comprising the steps of:

controlling display means to display an additional living thing image other than the living thing image which has been displayed on said display means, when a predetermined condition is satisfied while said living thing image is being displayed on said display means; and controlling said display means to display said additional living thing image with motion.

11. The image display control method according to claim 10 further comprising the steps of:

designating said additional living thing image; and controlling said display means to display a message by said living thing represented by said additional living image.

12. A computer readable recording medium storing a program which causes a computer to control display means to display at least one of a plurality of living thing images stored in image storage means, said program causes said computer to:

control said display means to display an additional living thing image other than said living thing image which has been displayed on said display means, when a predetermined condition is satisfied while said living thing image is being displayed on said display means; and controlling said display means to display said additional living thing image with motion.

13. An image display control device which controls display means to display at least one of a plurality of said living thing images stored in image storage means, comprising:

care means for allowing a user to care for the living thing represented by said living thing image being displayed on said display means; and image withdrawal control means for withdrawing said living thing image from said display means, when a predetermined condition for the care carried out through said care means is unsatisfied.

14. The image display control device according to claim 13 further comprising:
   cancel condition setting means for setting a condition for canceling the withdrawal of said living thing image by said image withdrawal control means; and
   image revival control means for controlling said display means to redisplay said living thing image in accordance with the condition set by said cancel condition setting means.

15. The image display control device according to claim 13 further comprising:
   achievement data storage means for storing data representing achievement of the care carried out through said care means;
   withdrawal cancel means for arbitrarily canceling the withdrawal of said living thing image being withdrawn by said image withdrawal means, wherein the condition set by said cancel condition setting means is weighted in inverse proportion to the achievement data stored in said achievement data storage means; and
   condition update means for loosening up on the condition set by said cancel condition setting means each time the withdrawal of said living thing image is canceled by said withdrawal cancel means.

16. The image display control device according to claim 13 further comprising:
   search means for searching the living thing image being withdrawn by said image withdrawal control means, in accordance with the user's operation; and
   search result display means for controlling said display means to display a result of the search by said search means.

17. An image control method for controlling display means to display at least one of a plurality of living thing images stored in image storage means comprising the steps of:
   caring for a living thing represented by said living thing image being displayed on said display means;
   withdrawing said living thing image from said display means, when a predetermined condition for the care carried out by said caring step is unsatisfied.

18. The image display control method according to claim 17 further comprising the steps of:
   setting a condition for canceling the withdrawal of said living thing image being withdrawn by said image withdrawing step; and
   controlling said display means to re-display said withdrawn living thing image, in accordance with the condition set by said condition setting means.

19. The image display control method according to claim 17 further comprising the steps of:
   storing data representing achievement of the care by said living thing caring step;
   arbitrarily canceling the withdrawal of said living thing image, wherein said condition set by said cancel condition is weighted in inverse proportion to the achievement data stored by said achievement data storing step, and
   loosening up on the condition set by said cancel condition setting step each time the withdrawal of said living thing image is cancelled by said withdrawal canceling step.

20. The image display control method according to claim 17 further comprising the steps of:
   searching said living thing image being withdrawn by said image withdrawing step; and
   controlling said display means to display a result of the search by said searching step.

21. A computer readable recording medium storing a program which causes a computer to control display means to display at least one of a plurality of living thing images stored in image storage means, said program causes said computer to:
   allow a user to care for said living thing represented by said living thing image displayed on said display means; and
   withdraw said living thing image from said display means, when a predetermined condition for the care carried out by the user is unsatisfied.

* * * * *